(12) United States Patent
Seto et al.

(10) Patent No.: US 8,689,860 B2
(45) Date of Patent: Apr. 8, 2014

(54) VEHICULAR AIR CONDITIONING APPARATUS

(75) Inventors: Takahiro Seto, Utsunomiya (JP); Junichi Kanemaru, Columbus, OH (US); Shinji Kakizaki, Dublin, OH (US)

(73) Assignees: Keihin Corporation, Tokyo (JP); Honda Motor Co., Ltd., Tokyo (JP)

( * ) Notice: Subject to any disclaimer, the term of this patent is extended or adjusted under 35 U.S.C. 154(b) by 796 days.

(21) Appl. No.: 12/500,705

(22) Filed: Jul. 10, 2009

(65) Prior Publication Data

US 2011/0005713 A1 Jan. 13, 2011

(51) Int. Cl.
*B60H 1/00* (2006.01)

(52) U.S. Cl.
USPC ............... 165/204; 165/202; 165/203

(58) Field of Classification Search
USPC .................... 165/41, 42, 43, 204
See application file for complete search history.

(56) References Cited

U.S. PATENT DOCUMENTS

| | | | | |
|---|---|---|---|---|
| 4,559,994 A | * | 12/1985 | Waldmann et al. | 165/41 |
| 5,309,731 A | | 5/1994 | Nonoyama et al. | |
| 5,390,728 A | * | 2/1995 | Ban | 165/204 |
| 6,308,770 B1 | * | 10/2001 | Shikata et al. | 165/42 |
| 6,311,763 B1 | * | 11/2001 | Uemura et al. | 165/43 |
| 6,422,309 B2 | * | 7/2002 | Vincent | 165/204 |
| 6,640,890 B1 | * | 11/2003 | Dage et al. | 165/203 |
| 6,796,368 B1 | * | 9/2004 | Saida et al. | 165/43 |
| 2004/0093885 A1 | * | 5/2004 | Ito et al. | 62/244 |
| 2005/0126774 A1 | * | 6/2005 | Yamaguchi et al. | 165/204 |
| 2007/0023180 A1 | * | 2/2007 | Komarek et al. | 165/202 |
| 2007/0137833 A1 | * | 6/2007 | Kang et al. | 165/42 |

FOREIGN PATENT DOCUMENTS

| | | |
|---|---|---|
| JP | 05-178068 | 7/1993 |
| JP | 06-040236 | 2/1994 |
| JP | 06-191257 | 7/1994 |

* cited by examiner

*Primary Examiner* — Mohammad M Ali
*Assistant Examiner* — Ian Soule
(74) *Attorney, Agent, or Firm* — Rankin, Hill & Clark LLP

(57) ABSTRACT

In a vehicular air conditioning apparatus, a first blower unit is connected by a connection duct to a side of a casing constituted by respective air passages. On a lower portion of the casing, a second blower unit different from the first blower unit is connected. A center plate is disposed centrally in a lateral direction of the casing. Air is supplied from the first blower unit to the interior of the casing, whereby cool air cooled by an evaporator and warm air heated by a heater core are mixed together and blown respectively and separately to a driver's seat side and a passenger seat side of the front seats. Also, Air supplied from the second blower unit to the interior of the casing, after being adjusted to a predetermined temperature in the evaporator and the heater core, is supplied to a rear seat side of the vehicle.

7 Claims, 14 Drawing Sheets

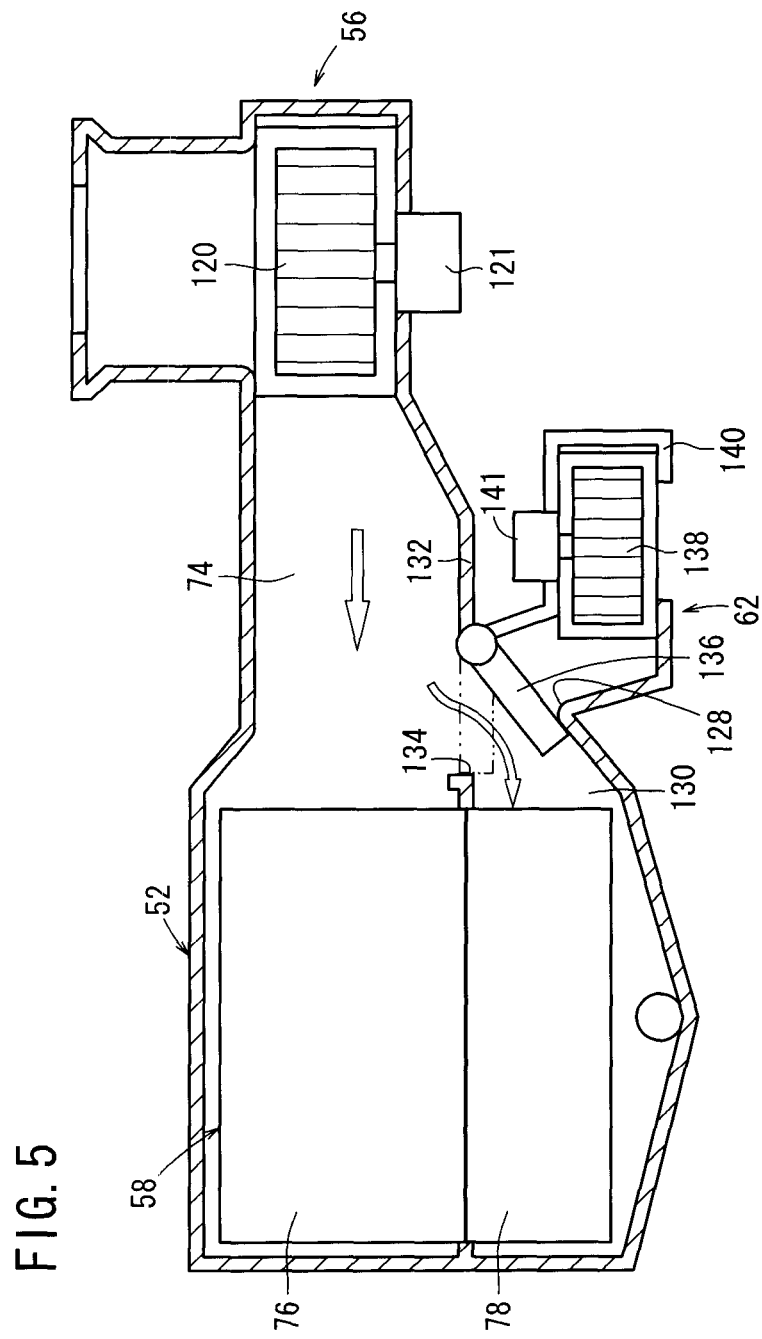

VEHICULAR AIR CONDITIONING APPARATUS

BACKGROUND OF THE INVENTION

1. Field of the Invention

The present invention relates to a vehicular air conditioning apparatus mounted in a vehicle for blowing air into a vehicle compartment that has been adjusted in temperature by a cooling means and a heating means, for thereby performing temperature adjustment of the vehicle compartment.

2. Description of the Related Art

In a vehicular air conditioning apparatus that is mounted in a vehicle, internal and external air is drawn into a casing by a blower, and after cooled air, which has been cooled by an evaporator that forms a cooling means, and heated air, which has been heated by a heater core that forms a heating means, are mixed together in the casing at a predetermined mixing ratio, the mixed air is blown out from a defroster blow-out port, a face blow-out port, or a foot blow-out port, whereby adjustment of temperature and humidity in the vehicle compartment is carried out.

With this type of vehicular air conditioning apparatus, for example, as disclosed in Japanese Laid-Open Patent Publication No. 05-178068, Japanese Laid-Open Patent Publication No. 06-040236 and Japanese Laid-Open Patent Publication No. 06-191257, it is known to provide a first blower for the purpose of taking in air from the vehicle compartment into the casing, and a second blower for the purpose of taking in external air outside of the vehicle compartment into the casing. In such a vehicular air conditioning apparatus, air that is introduced from an internal air introduction port by rotation of the first blower is heated by a first heat exchanger and then is blown into the vehicle compartment through a first air passage from the face blow-out port or the foot blow-out port. In addition, air that is introduced from an external air introduction port by rotation of the second blower is heated by a second heat exchanger and then is blown into the vehicle compartment through a second air passage from the defroster blow-out port. More specifically, a switching operation is performed such that when air is blown out from the face blow-out port or the foot blow-out port, the first blower is driven and air from the interior of the vehicle is introduced, whereas when air is blown out from the defroster blow-out port, the second blower is rotated and external air is introduced.

Further, in another vehicular air conditioning device having first and second blowers for introducing air, the first blower is arranged facing toward an external air introducing port of a duct, and the second blower is arranged facing toward an interior air introducing port. Additionally, the first blower includes a switching means, which is capable of switching the air that is introduced to the duct by the first blower between interior air and exterior air.

In addition, the air that is introduced to the duct by the first blower is switched between interior air and exterior air by the switching means, and after the air has been adjusted in temperature by a heating means and a cooling means so as to provide a desired temperature together with the air introduced to the duct by the second blower, the air is blown into a desired region in the vehicle compartment through a face blow-out port, a foot blow-out port, or a defroster blow-out port.

Generally, a vehicular air conditioning apparatus is known, which is capable of independently and respectively controlling air conditioning of the driver's seat side and the passenger seat side in the vehicle compartment. However, with the aforementioned vehicular air conditioning apparatus equipped with two blowers, in the case that air conditioning is controlled independently with respect to the driver's seat side and the passenger seat side, it is necessary for respective passages through which air is conveyed from the two blowers to be formed separately in the case interior, such that the flow path cross sectional areas of the divided passages become smaller respectively, and a desired air flow rate cannot be obtained. For example, in a vehicular air conditioning apparatus having two blowers in this manner, for a desired air flow rate to be obtained, it is necessary for the casing to be made larger in size, so that the flow path cross sectional area of the passages can be assured to have the same cross sectional area as a case in which the passages are not divided.

SUMMARY OF THE INVENTION

A general object of the present invention is to provide a vehicular air conditioning apparatus, in which, without increasing the size of the casing, temperature control of front seats and rear seats, respectively, in the vehicle compartment can be carried out separately and independently, and further, wherein by separately and independently carrying out temperature control of the driver's seat side and passenger seat side, respectively, in the front seats, the comfort of occupants in the vehicle compartment can be enhanced.

In order to achieve the aforementioned object, the present invention is characterized by a vehicular air conditioning apparatus including a casing mounted in the vehicle and having a plurality of passages therein through which air flows, a cooling heat exchanger for cooling the air, and a heating heat exchanger for heating the air, a first blower for blowing the air mainly toward a seat or group of seats on al forward side of the vehicle, a first air mixing damper for adjusting a first passage through which air that is blown from the first blower flows and for adjusting the temperature of the air, a second blower for blowing the air that is blown out mainly toward another seat or group of seats, a second air mixing damper for adjusting a second passage through which air that is blown from the second blower flows and for adjusting the temperature of the air, and communication switching dampers for switching a communication state between the first passage and the second passage.

The first passage comprises a pair of passages made up of a passage through which air flows that is blown to a driver's seat side in a vehicle compartment and a passage through which air flows that is blown toward a passenger seat side in the vehicle compartment. The communication switching dampers are disposed respectively in one passage and another passage of the pair of passages.

According to the present invention, a first passage through which air is blown from the first blower toward a seat or group of seats on a forward side in the vehicle, and a second passage through which air is blown from the second blower toward another seat or group of seats in the vehicle are provided in the casing. By switching a communication state between the first passage and the second passage by means of the communication switching dampers, the air that is blown from the first blower toward a seat or group of seats on a forward side in the vehicle, and the air that is blown from the second blower toward another seat or group of seats in the vehicle can be controlled respectively and independently of each other. Further, the first passage comprises a passage through which air is blown to a driver's seat side in a vehicle compartment, and a passage through which air is blown toward a passenger seat side in the vehicle compartment. The communication switching dampers are provided respectively, such that the flow rate of air supplied to one of the passages in the first passage for blowing air to the driver's seat side, and the flow rate of air supplied to the other of the passages in the first passage for blowing air to the passenger seat side, are each controlled respectively and independently by the communication switching dampers.

Accordingly, adjustment in temperature of air that is blown respectively toward a seat or group of seats of the front seats and seats other than the front seats in the vehicle compartment is carried out separately and independently, so that the comfort of occupants in the vehicle compartment can be further enhanced. Together therewith, blowing and temperature adjustment of air to the driver's seat side, and blowing and temperature adjustment of air to the passenger seat side in the vehicle compartment, is carried out respectively and independently, so that the comfort of the occupants can be further enhanced.

The above and other objects features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 5 is an outline schematic view showing a casing, first and second blower units, and an evaporator that constitute the vehicular air conditioning apparatus of FIG. 1;

DESCRIPTION OF THE PREFERRED EMBODIMENTS

Figure 1:
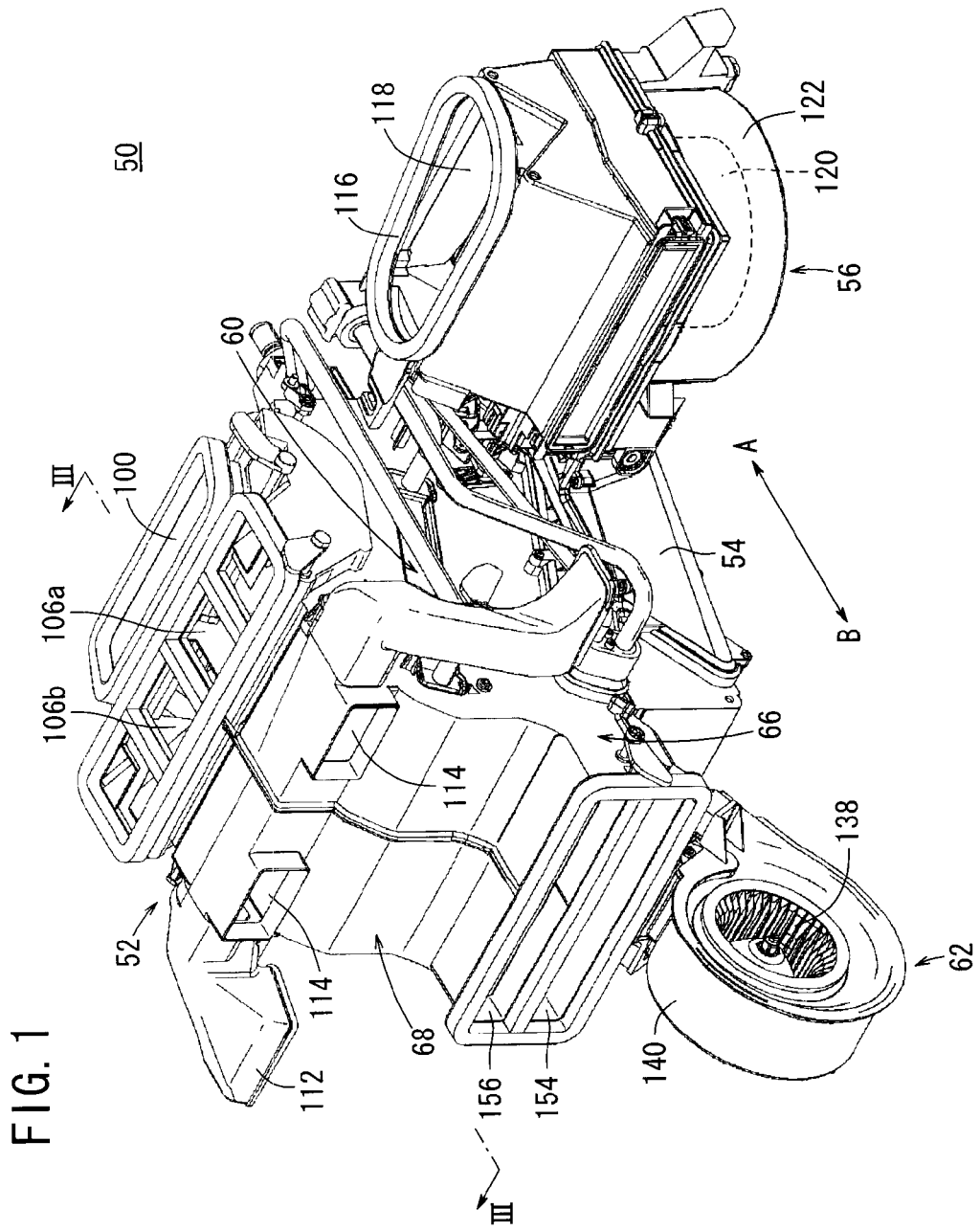
FIG. 1 is an external perspective view of a vehicular air conditioning apparatus according to a first embodiment of the present invention.

A preferred embodiment of a vehicular air conditioning apparatus shall be presented and explained in detail below with reference to the accompanying drawings. In FIG. 1, reference numeral 50 indicates a vehicular air conditioning apparatus according to a first embodiment of the present invention. The vehicular air conditioning apparatus 50, for example, is installed in a vehicle having three rows of seats arranged along the direction of travel of the vehicle. In the following descriptions, the first row of seats in the vehicle compartment of the vehicle is designated as front seats, the second row of seats is designated as middle seats, and the third row of seats is designated as rear seats.

Figure 2:
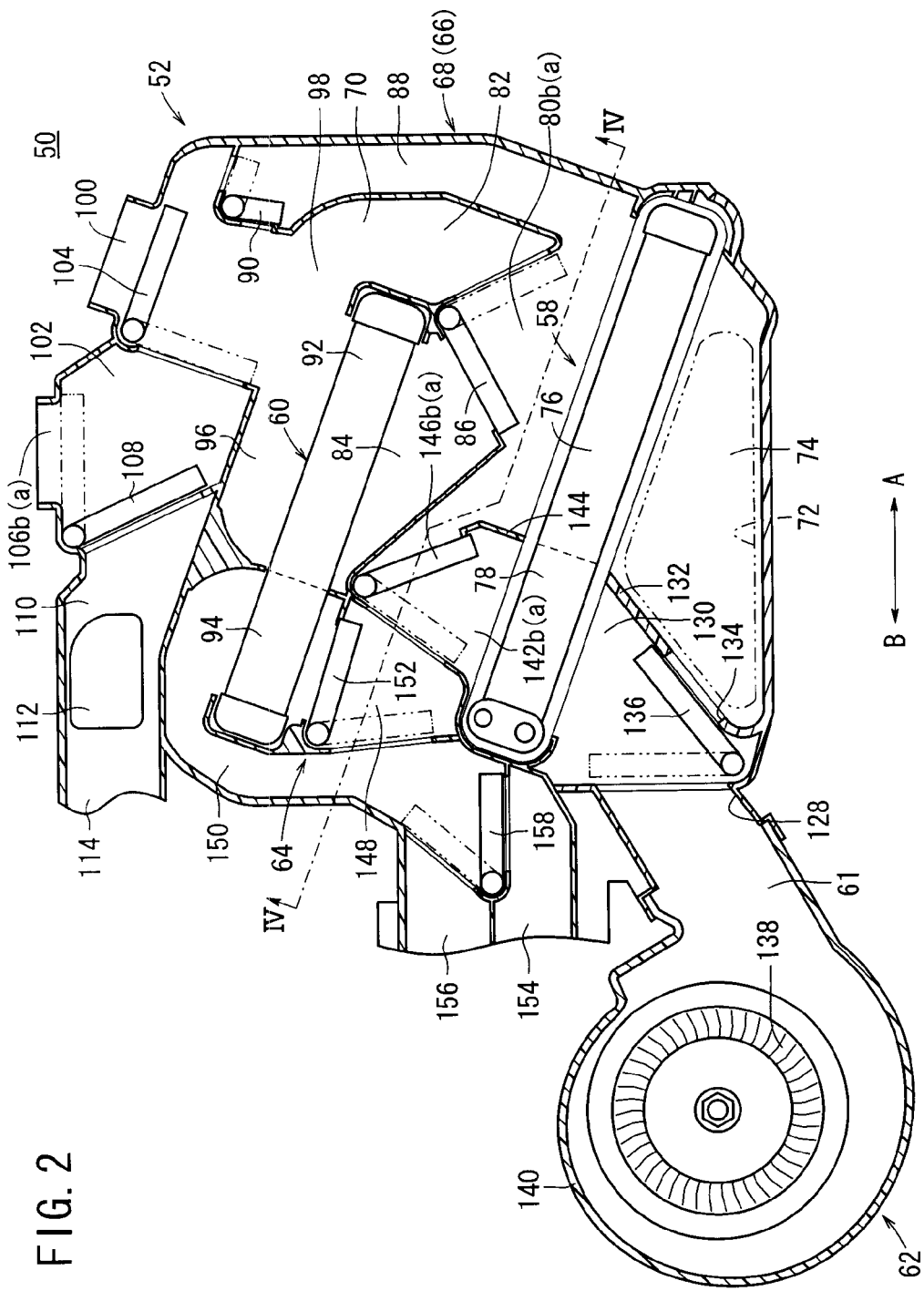
FIG. 2 is an overall cross sectional view of the vehicular air conditioning apparatus shown in FIG. 1.

Further, the vehicular air conditioning apparatus 50 is installed so that the righthand side thereof shown in FIG. 2 (in the direction of arrow A) is oriented toward the front side of the vehicle, whereas the lefthand side (in the direction of arrow B) is oriented toward the rear side of the vehicle. The arrow A direction shall be described as a forward direction, whereas the arrow B direction shall be described as a rearward direction.

In the first and second embodiments described below, inside the casing, plural rotating members made up of dampers or the like are provided, wherein the rotating members are operated by rotational drive sources such as motors or the like. For purposes of simplification, depictions and explanations concerning such rotational drive sources have been omitted.

As shown in FIGS. 1 and 2, the vehicular air conditioning apparatus 50 includes a casing 52 constituted by respective air passages, a first blower unit (first blower) 56 connected through a connection duct 54 to a side portion of the casing 52 for blowing air toward the front seat side of the vehicle, an evaporator (cooling heat exchanger) 58 for cooling air a heater core (heating heat exchanger) 60 for heating air that are arranged inside the casing 52, a second blower unit (second blower) 62 connected to a lower portion of the casing 52 for taking in air from inside the vehicle compartment (interior air) and blowing the air toward the rear seats of the vehicle, and a damper mechanism 64 for switching the flow of air that flows through and inside each of the respective passages.

The casing 52 is constituted by first and second divided casings 66, 68 having substantially symmetrical shapes, wherein a center plate 70 is disposed between the first divided casing 66 and the second divided casing 68. The connection duct 54 is connected on a lower side portion of the first divided casing 66, and a first intake port 72 is formed through which air is supplied from the first blower unit 56. The first intake port 72 communicates with a first front passage (first passage) 74 disposed on an upstream side of the evaporator 58. The evaporator 58 is disposed so as to straddle between the first divided casing 66 and the second divided casing 68. One end of the evaporator 58 in the forward direction (the direction of arrow A) of the vehicle is inclined downward at a predetermined angle with respect to the other end thereof in the rearward direction of the vehicle.

The evaporator 58 includes a first cooling section 76, which faces the first front passage 74 and cools air supplied from the first front passage 74, and a second cooling section 78, which faces the first rear passage 130 and cools air supplied from the first rear passage 130.

On the other hand, on a downstream side of the evaporator 58, second front passages 80a, 80b are formed, through which air having passed through the first cooling section 76 is supplied. Upwardly of the second front passages 80a, 80b, a third front passage 82 and a fourth front passage 84 are formed in a branching or bifurcated manner. Further, in the second front passages 80a, 80b, a first air mixing damper 86 is rotatably disposed so as to face toward the branching portion of the third front passage 82 and the fourth front passage 84. Additionally, by rotation of the first air mixing damper 86, the blowing condition and blowing rate of cooled air that has passed through the evaporator 58 into the third front passage 82 and the fourth front passage 84 is adjusted. The third front passage 82 is arranged on the forward side (the direction of arrow A), whereas the fourth front passage 84 is arranged on the rearward side (the direction of arrow B) of the casing 52. The heater core 60 is disposed on a downstream side of the fourth front passage 84.

Further, on the forward side (in the direction of arrow A) of the third front passage 82, a bypass passage 88 is formed, which extends along the third front passage 82 and supplies air to a later-described mixing section 98 downstream from the evaporator 58, and a bypass damper 90 is disposed on a downstream side of the bypass passage 88. The bypass passage 88 is provided to supply cool air cooled by the evaporator 58 directly to the downstream side under a switching action of the bypass damper 90.

The heater core 60, similar to the evaporator 58, is disposed so as to straddle between the first divided casing 66 and the second divided casing 68. One end of the heater core 60 in the forward direction (the direction of arrow A) of the vehicle is inclined downward at a predetermined angle with respect to the other end thereof in the rearward direction of the vehicle. The heater core 60 includes a first heating section 92, which faces the fourth front passage 84 and heats air supplied from the fourth front passage 84, and a second heating section 94, which faces the third rear passage 148 and heats air supplied from the third rear passage 148.

On the downstream side of the heater core 60, a fifth front passage 96 is formed. The fifth front passage 96 extends in the forward direction, and at a location that merges downstream from the third front passage 82, the mixing section 98 is formed, in which cooled air supplied through the third front passage 82 and warm air supplied through the fifth front passage 96 are mixed. A defroster blow-out port 100 opens upwardly of the mixing section 98, and to the side of the mixing section 98, a sixth front passage 102 extending rearward is formed.

Further, in the mixing section 98, a defroster damper 104 is rotatably disposed, facing the defroster blow-out port 100. By rotation of the defroster damper 104, the blowing state of air into the defroster blow-out port 100 and the sixth front passage 102 is switched, and the blowing rate thereof is adjusted.

In the sixth front passage 102, a first vent blow-out port 106 opens upwardly, and a vent damper 108 is rotatably disposed facing toward the first vent blow-out port 106, and communicating with a seventh front passage 110, which extends further rearward. By rotation of the vent damper 108, the blowing state of air is switched when air is blown from the mixing section 98 to the first vent blow-out port 106 and the seventh front passage 110, and further, the blowing rate of the air is capable of being adjusted.

The defroster blow-out port 100 and the first vent blow-out port 106 open respectively upwardly of the casing 52. The defroster blow-out port 100 is arranged on a forward side (in the direction of arrow A), whereas the first vent blow-out port 106 is arranged on the rearward side (in the direction of arrow B), substantially centrally in the casing 52 with respect to the defroster blow-out port 100.

On a downstream side of the seventh front passage 110, a first heat passage 112 is connected, which extends in the widthwise direction of the casing 52 and blows air through a non-illustrated first heat blow-out port in the vicinity of the feet of passengers in the front seats in the vehicle compartment. Together therewith, a second heat passage 114 is connected, which extends rearwardly of the casing 52 and blows air through a second heat blow-out port (not shown) in the vicinity of the feet of passengers in the middle seats inside the vehicle compartment.

The first blower unit 56 includes an intake damper 118 in which a duct 116 for introducing external air is disposed in an inlet opening thereof, for carrying out switching of internal and external air, and a first blower fan 120 for supplying to the interior of the casing 52 air (external air or internal air) that is taken in from the duct 116. A blower case 122 in which the first blower fan 120 is accommodated communicates with the interior of the casing 52 via a connection duct 54 connected to the first intake port 72. The first blower fan 120 is controlled by a blower motor 121, which is driven by supplying electrical power thereto.

In this manner, air supplied from the first blower unit 56 is introduced to the interior of the casing 52 through the connection duct 54 and the first intake port 72, and by rotating actions of the first air mixing damper 86, the defroster damper 104, the vent damper 108 and the bypass damper 90, which collectively make up the damper mechanism 64, air is selectively supplied through the first through seventh front passages 74, 80a, 80b, 82, 84, 96, 102, 110, and the bypass passage 88 into the defroster blow-out port 100, the first vent blow-out port 106 and the first and second heat passages 112, 114, which are capable of blowing air to the front and middle seats in the vehicle.

On the other hand, on a lower portion of the casing 52, a second intake port 128 through which air is supplied from the second blower unit 62 is formed on a rearward side (in the direction of arrow B) perpendicular to the first intake port 72. The second intake port 128 opens at a position on an upstream side of the evaporator 58 and communicates with the first rear passage 130.

The first rear passage 130 is separated from the first front passage 74 by a first dividing wall 132, and a rotatable ventilation switching damper (communication switching damper) 136 is provided between a communication opening 134 formed in the first dividing wall 132 and the second intake port 128. In addition, in the case that a mode is selected in which blowing of air from the second blower unit 62 is halted and blowing of air only from the first blower unit 56 is carried out, by blocking the second intake port 128 by the ventilation switching damper 136 (i.e., the state shown by the two-dot-dash line in FIG. 2), backflowing of air into the second blower unit 62 can be prevented when a portion of the air supplied from the first blower unit 56 passes through the interior of the evaporator 58 and the heater core 60, and is leaked out to the side of the first through fourth rear passages 130, 142a, 142b, 148, 150. Consequently, noise generated at the second blower unit 62 caused by backflowing of air can be prevented, and air is prevented from reaching the second blower unit 62 and being blown out into the vehicle compartment. In other words, blowing of unnecessary air into the vehicle compartment is averted, and imparting a sense of discomfort to occupants in the vehicle can be avoided.

In this case, as shown in FIG. 5, by rotating the ventilation switching damper 136 to the side of the second intake port 128 and opening the communication opening 134, a portion of the air supplied to the first front passage 74 can be supplied to the side of the first rear passage 130. Driving control of the ventilation switching damper 136 shall be described subsequently.

The second blower unit 62 includes a second blower fan 138 that takes in air (internal air) from the vehicle compartment and supplies the intake air to the interior of the casing 52. A blower case 140 in which the second blower fan 138 is accommodated is connected to the second intake port 128 of the casing 52 and communicates with the first rear passage 130. The second blower fan 138, similar to the first blower fan 120, is controlled by a second blower motor 141, which is driven by supplying electrical power thereto.

On a downstream side of the first rear passage 130, second rear passages 142a, 142b are formed to which air that has passed through the second cooling section 78 of the evaporator 58 is supplied. The second rear passages 142a, 142b are separated from the second front passages 80a, 80b by a second dividing wall 144, and the second dividing wall 144 extends to the evaporator 58. Owing thereto, on a downstream side of the evaporator 58, air that has passed through the first rear passage 130 and flows to the second cooling section 78 of the evaporator 58 does not intermix mutually with air that has passed through the first front passage 74 and flows to the first cooling section 76 of the evaporator 58.

Figure 3:
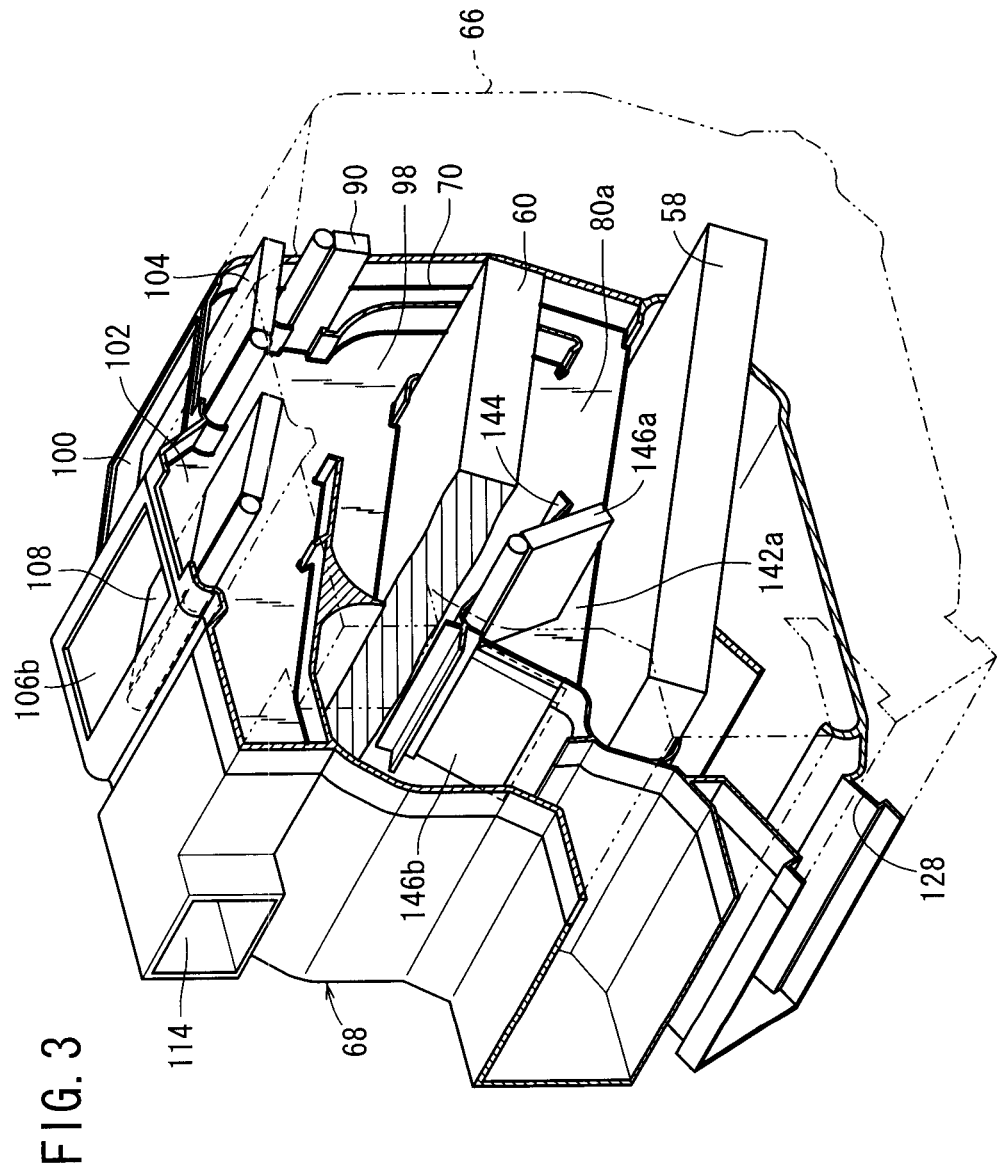
FIG. 3 is a cross sectional perspective view taken along line III-III of FIG. 1.
Figure 4:
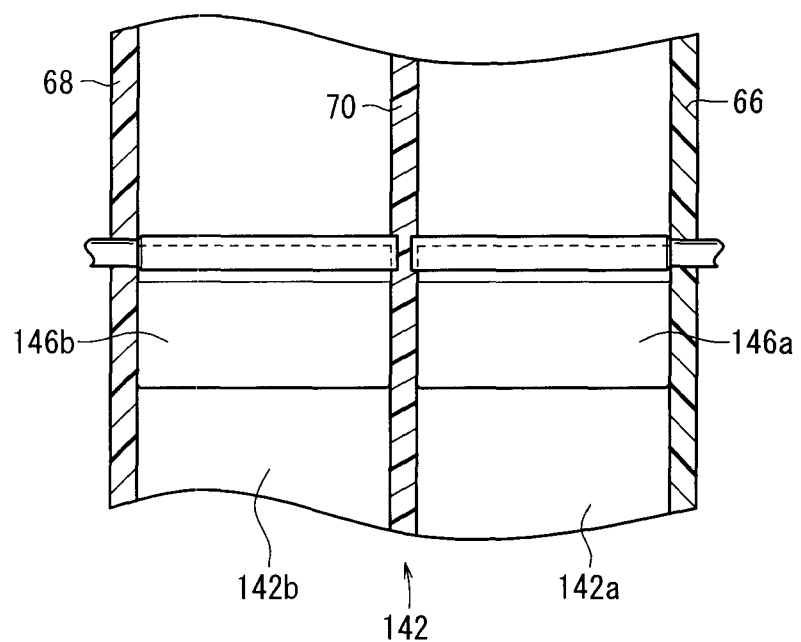
FIG. 4 is a partial cross sectional view taken along line IV-IV of FIG. 2.

Herein, as shown in FIG. 3, the second rear passages 142a, 142b, the second front passages 80a, 80b and the first vent blow-out port 106 are separated respectively on sides of the first and second divided casings 66, 68 about the center plate 70, which is disposed in the center of the casing 52, thereby forming the second rear passage 142a and the second rear passage 142b, the second front passage 80a and the second front passage 80b, and the first vent blow-out port 106a and the first vent blow-out port 106b. Furthermore, as shown in FIG. 4, a pair of communication switching dampers 146a, 146b, which are capable of switching a communication state between the second front passage 80a and the second front passage 80b, are disposed in the second rear passage 142a and the second rear passage 142b, respectively, wherein one of the communication switching dampers 146a and the other of the communication switching dampers 146b are rotatably controlled separately and independently from each other.

In addition, by rotation of the pair of communication switching dampers 146a, 146b, the second rear passages 142a, 142b for blowing air to the middle seats and rear seats in the vehicle compartment are placed in communication mutually with the second front passages 80a, 80b for blowing air to the front seats in the vehicle compartment, such that, for example, by changing, respectively, the rotation amount of one of the communication switching dampers 146a and the rotation amount of the other communication switching damper 146b, the blowing rate and temperature of air that is blown from the first vent blow-out port 106a through the second front passage 80a, and the blowing rate and temperature of air that is blown from the first vent blow-out port 106b through the second front passage 80b, can be controlled separately from each other.

The third rear passage 148 facing the heater core 60 is formed on the downstream side of the second rear passages 142a, 142b. One side of the heater core 60 opens into the third rear passage 148, whereas another side thereof opens onto the side of an adjacent fourth rear passage 150. In addition, a second air mixing damper 152, which mixes at a predetermined mixing ratio the cool air and warm air supplied to the third rear passage 148, thereby producing mixed air, is disposed rotatably in the third rear passage 148. The second air mixing damper 152 switches the communication state between the third rear passage 148 and the upstream or downstream side of the fourth rear passage 150, which is connected to the downstream side of the heater core 60. Consequently, air cooled by the evaporator 58 and supplied to the third rear passage 148, and air heated by the heater core 60 and that flows to the fourth rear passage 150, are mixed at a predetermined mixing ratio inside the fourth rear passage 150 by rotation of the second air mixing damper 152, and are blown out therefrom. Specifically, an intermediate location of the fourth rear passage 150 functions as a mixing section, for mixing cool air and warm air that is blown to the middle seats and rear seats in the vehicle.

The fourth rear passage 150 bends so as to circumvent the other end of the heater core 60 and extends to communicate with fifth and sixth rear passages 154, 156, which branch on a downstream side thereof. A rotatable mode switching damper 158 is disposed at the branching location of the fifth and sixth rear passages 154, 156. The communication state between the fourth rear passage 150 and the fifth and sixth rear passages 154, 156 is switched by rotation of the mode switching damper 158.

The fifth and sixth rear passages 154, 156 extend respectively in the rearward direction (the direction of arrow B) of the vehicle. The fifth rear passage 154 communicates with a second vent blow-out port (not shown) for blowing air in the vicinity of the faces of passengers in the middle seats in the vehicle. On the other hand, the sixth rear passage 156 communicates with third and fourth heat blow-out ports (not shown) for blowing air in the vicinity of the feet of passengers riding in the middle and rear seats.

More specifically, air supplied from the second blower unit 62 is introduced to the interior of the casing 52 through the second intake port 128, and under rotating actions of the second air mixing damper 152 and the mode switching damper 158, which make up the damper mechanism 64, the air passes through the first through sixth rear passages 130, 142a, 142b, 148, 150, 154, 156 and is supplied selectively to the second vent blow-out port, and the third and fourth heat blow-out ports (not shown), which are capable of blowing air to the middle and rear seats in the vehicle.

The aforementioned second through sixth front passages 80a, 80b, 82, 84, 96, 102, the bypass passage 88 and the second rear passages 142a, 142b are disposed respectively so as to straddle between the first divided casing 66 and the second divided casing 68. However, as easily understood, these passages also are divided by the center plate 70, which is disposed in the center of the casing 52.

The vehicular air conditioning apparatus 50 according to the first embodiment of the present invention is basically constructed as described above. Next, operations and effects of the invention shall be explained.

First, when operation of the vehicular air conditioning apparatus 50 is started, the first blower fan 120 of the first blower unit 56 is rotated by supplying electrical power thereto, and air (interior or exterior air) that is taken in through the duct 116 or the like is supplied to the first front passage 74 of the casing 52 through the connection duct 54. Simultaneously, air (interior air), which is taken in by rotation of the second blower fan 138 of the second blower unit 62 by supplying electrical power thereto, is supplied to the first rear passage 130 from the blower case 140 while passing through the second intake port 128. In the following descriptions, air supplied to the interior of the casing 52 by the first blower fan 120 shall be referred to as "first air," and air supplied to the interior of the casing 52 by the second blower fan 138 shall be referred to as "second air."

The first air and the second air supplied to the interior of the casing 52 are each cooled by passing respectively through the first and second cooling sections 76, 78 of the evaporator 58, and flow respectively as chilled air to the second front passages 80a, 80b and the second rear passages 142a, 142b, in which the first and second air mixing dampers 86, 152 are disposed.

In the case that a vent mode, for example, is selected by a passenger for blowing air in the vicinity of the faces of passengers, the first air mixing damper 86 is rotated to an intermediate position between the third front passage 82 and the fourth front passage 84, whereupon the first air (cooled air) supplied to the third front passage 82 flows into the mixing section 98, and the first air supplied to the fourth front passage 84 is heated by passing the heater core 60 to become heated air, and flows into the mixing section 98 through the fifth front passage 96, whereby the first cooled air and the first heated air are mixed together.

The first air (mixed air), which is made up of the cool air and heated air mixed in the mixing section 98, passes through the sixth front passage 102 and is blown in the vicinity of the faces of passengers in the vehicle compartment from the first vent blow-out port 106, due to the fact that the defroster blow-out port 100 is blocked by the defroster damper 104, and further, the opening of the seventh front passage 110 is blocked by the vent damper 108.

On the other hand, the second air mixing damper 152 is rotated to an intermediate position in the interior of the third rear passage 148, whereupon the second air (cool air) supplied to the third rear passage 148 is heated by passing through the heater core 60 to become heated air, and flows to the downstream side through the fourth rear passage 150. Together therewith, cooled second air is supplied directly into the fourth rear passage 150 from the opening of the third rear passage 148, is mixed together with the heated second air, and flows to the downstream side. In addition, under a switching action of the mode switching damper 158, the second air (mixed air) passes through the fifth rear passage 154 and is blown in the vicinity of the faces of passengers in the middle seats in the vehicle compartment from the second vent blow-out port (not shown).

Next, in the case that a bi-level mode is selected for blowing air in the vicinity of the faces and feet of passengers in the vehicle compartment, the first air mixing damper 86 is rotated somewhat toward the side of the third front passage 82, whereas the vent damper 108 is placed in an intermediate position, rotated somewhat to the side of the first vent blow-out port 106 compared to the case of the vent mode. Additionally, the first air that has passed through the evaporator 58 is supplied directly into the mixing section 98 via the bypass passage 88, is mixed in the mixing section 98 with the first air (mixed air) that is supplied through the third and fifth front passages 82, 96, and is blown in the vicinity of the faces of passengers from the first vent blow-out port 106. Further, a portion of the first air (mixed air), which flows to the sixth front passage 102 from the mixing section 98, passes through the sixth and seventh front passages 102, 110 and is supplied respectively to the first and second heat passages 112, 114, whereby the air is blown in the vicinity of the feet of passengers in the front and middle seats in the vehicle compartment from the first and second heat blow-out ports (not shown).

At the same time, the second air mixing damper is rotated somewhat in a direction away from the heater core 60, and the mode switching damper 158 is rotated from the position closing the sixth rear passage 156 to an intermediate position between the fifth rear passage 154 and the sixth rear passage 156. In addition, as for the second air, heated air heated by the heater core 60 and cooled air, which is supplied to the fourth rear passage 150 through the opening from the third rear passage 148, are mixed together and blown as mixed air from the fifth rear passage 154, through the second vent blow-out port, and in the vicinity of the faces of passengers riding in the middle seats in the vehicle compartment, while also being blown from the sixth rear passage 156, past the third and fourth heat blow-out ports, and in the vicinity of the feet of passengers riding in the middle and rear seats in the vehicle compartment.

Next, in the case that the heat mode is selected for blowing air in the vicinity of the feet of passengers in the vehicle compartment, the first air mixing damper 86 is rotated further to the side of the third front passage 82 compared to the case of the bi-level mode, while the defroster damper 104 and the vent damper 108 are rotated respectively to block the defroster blow-out port 100 and the first vent blow-out port 106. Consequently, the first air (mixed air), which was mixed in the mixing section 98, passes through the sixth and seventh front passages 102, 110 and flows rearward to be supplied respectively to the first and second heat passages 112, 114, and is blown in the vicinity of the feet of passengers in the front and middle seats in the vehicle compartment from the non-illustrated first and second heat blow-out ports.

On the other hand, the second air mixing damper 152 is rotated further toward the side of the opening compared to the case of the bi-level mode, and further, the mode switching damper 158 is positioned to block the fifth rear passage 154. Consequently, the second air (mixed air), which is mixed in the fourth rear passage 150, passes from the fourth rear passage 150, through the sixth rear passage 156, and is supplied to the third and forth heat blow-out ports, whereby the air is blown in the vicinity of the feet of passengers in the middle and rear seats in the vehicle compartment.

Next, an explanation shall be made concerning a heat-defroster mode for blowing air in the vicinity of the feet of passengers in the vehicle compartment, as well as for blowing air in the vicinity of a front window for eliminating fog (condensation) from the front window. In the event that the heat-defroster mode is selected, the defroster damper 114 is rotated in a direction to separate from the defroster blow-out port 100, so as to assume an intermediate position between the opening of the sixth front passage 102, and together therewith, the first vent blow-out port 106 is blocked by the vent damper 108 (i.e., the condition of the two-dot-dash line shown in FIG. 2). Consequently, a portion of the first air (mixed air), which is mixed in the mixing section 98, passes through the defroster blow-out port 100 and is blown in the vicinity of the front window of the vehicle, while another portion of the first air flows past the sixth and seventh front passages 102, 110 and is blown in the vicinity of the feet of passengers in the front and middle seats in the vehicle compartment from the first and second heat passages 112, 114 and the first and second heat blow-out ports (not shown).

On the other hand, in the heat-defroster mode, in the case that second air is blown toward the middle seats and rear seats of the vehicle compartment, since this mode is the same as the heat mode discussed above, detailed explanations thereof shall be omitted.

Lastly, the defroster mode for blowing air only in the vicinity of the front widow for eliminating fog (condensation) from the front window in the vehicle shall be described. In this case, the defroster damper 104 is rotated to separate from the defroster blow-out port 100 while the opening of the sixth front passage 102 is blocked, and the first air (mixed air) is supplied from the mixing section 98 to the opened defroster blow-out port 100 and is blown in the vicinity of the front window in the vehicle. In this case, the defroster mode can be handled solely by blowing first air supplied only from the first blower unit 56, without driving the second blower unit 62.

Further, at this time, the ventilation switching damper 136 is rotated to separate away from the first dividing wall 132 thereby opening the communication passage 134, and the communication switching damper 146a(b) is rotated to place the second rear passage 142a(b) and the second front passage 80a(b) in communication, so that a portion of the first air supplied to the first front passage 74 is supplied to the side of the first rear passage 130. As a result, even in the case that the second blower unit 62 is not driven and second air is not supplied to the second rear passages 142a, 142b, since a portion of the first air can be made to pass through the second cooling section 78 of the evaporator 58, freezing of the evaporator 58 can be prevented.

Furthermore, by rotation of the ventilation switching damper 136, the second rear passage 142a(b) becomes blocked, whereby noises, which are produced by inflow of the first air into the second blower unit, can be prevented.

In each of the blowing modes excluding the aforementioned defroster mode, the first blower fan 120 and the second blower fan 138 are driven simultaneously, so that the first and second air are supplied at desired flow rates to the interior of the casing 52. In this case, in the present embodiment, drive controls for the first blower fan 120, the second blower fan 138 and the ventilation switching damper 136 are carried out through a controller 160 (described later), corresponding to a first air supply rate (blowing rate) and a second air supply rate (blowing rate) required during each of the blowing modes. First, the drive control for the ventilation switching damper 136 shall be explained below.

Figure 6A:
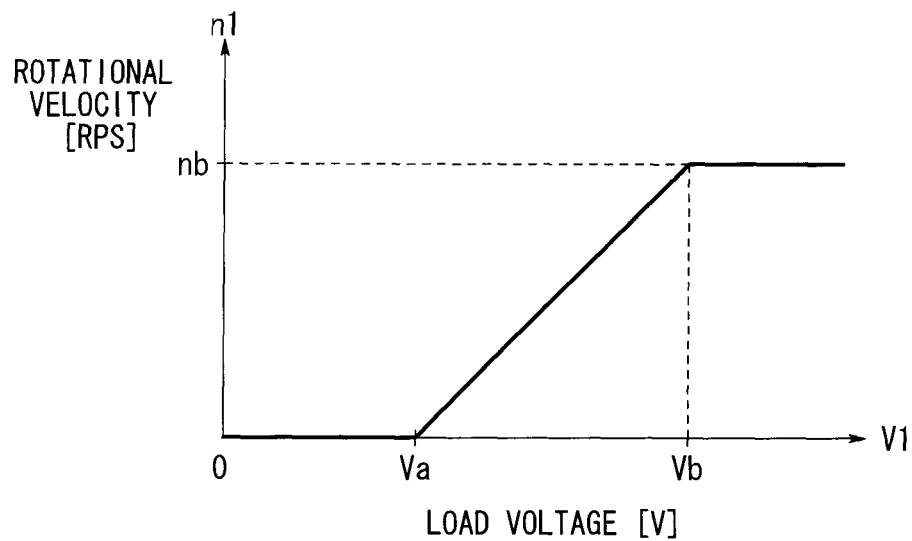
FIG. 6A is a correlational diagram showing a correlation between rotational speed and load voltage in the first blower fan.

Although the blowing rate of the first air is proportional to the rotation number (RPS), or more specifically the rotational velocity n1, of the first blower fan 120, the rotational velocity n1 can be determined approximately by a load voltage V1, which is supplied from a later-described power source 176 and through a first fan driver 170 to the first blower motor 121 that rotates the first blower fan 120. FIG. 6A shows a relationship between the rotational velocity n1 of the first blower fan 120 and the load voltage V1 supplied to the first blower fan 120. In this case, a drive start voltage of the first blower fan 120 is designated by Va, whereas the maximum rated voltage of the first blower fan 120 is designated by Vb. In the case that the voltage V1 is less than Va, the first blower fan 120 is not rotated. Further, in the case that the voltage V1 is greater than Vb, the voltage V1 is stepped down to the voltage Vb by a voltage protection circuit made up of a non-illustrated regulator or the like, whereby the first blower fan 120 is rotated at the same rotational velocity nb as when the voltage Vb is applied. As a result, imposition of a voltage on the first blower fan 120 that exceeds the maximum rated voltage is prevented, so that damage is not caused to the first blower fan 120 and the first fan driver 170.

Figure 6B:
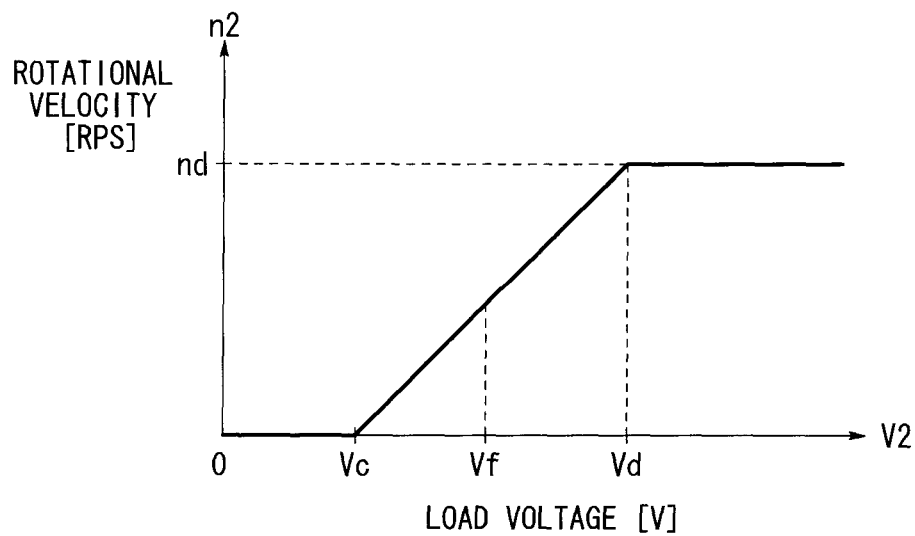
FIG. 6B is a correlational diagram showing a correlation between rotational speed and load voltage in the second blower fan.

Also, in the case that the second blower fan 138 is energized for blowing air, analogous to the case of the first blower fan 120, as shown in FIG. 6B, the load voltage supplied to the second fan driver 172 from the power source 176 is designated by V2, the rotational velocity is designated by n2, the drive start voltage is designated by Vc, the maximum rated voltage is designated by Vd, and the rotational velocity when the voltage Vd is applied is designated by nd. However, since control is carried out in the same manner as the control for the first blower fan 120, detailed explanations thereof have been omitted.

Figure 7:
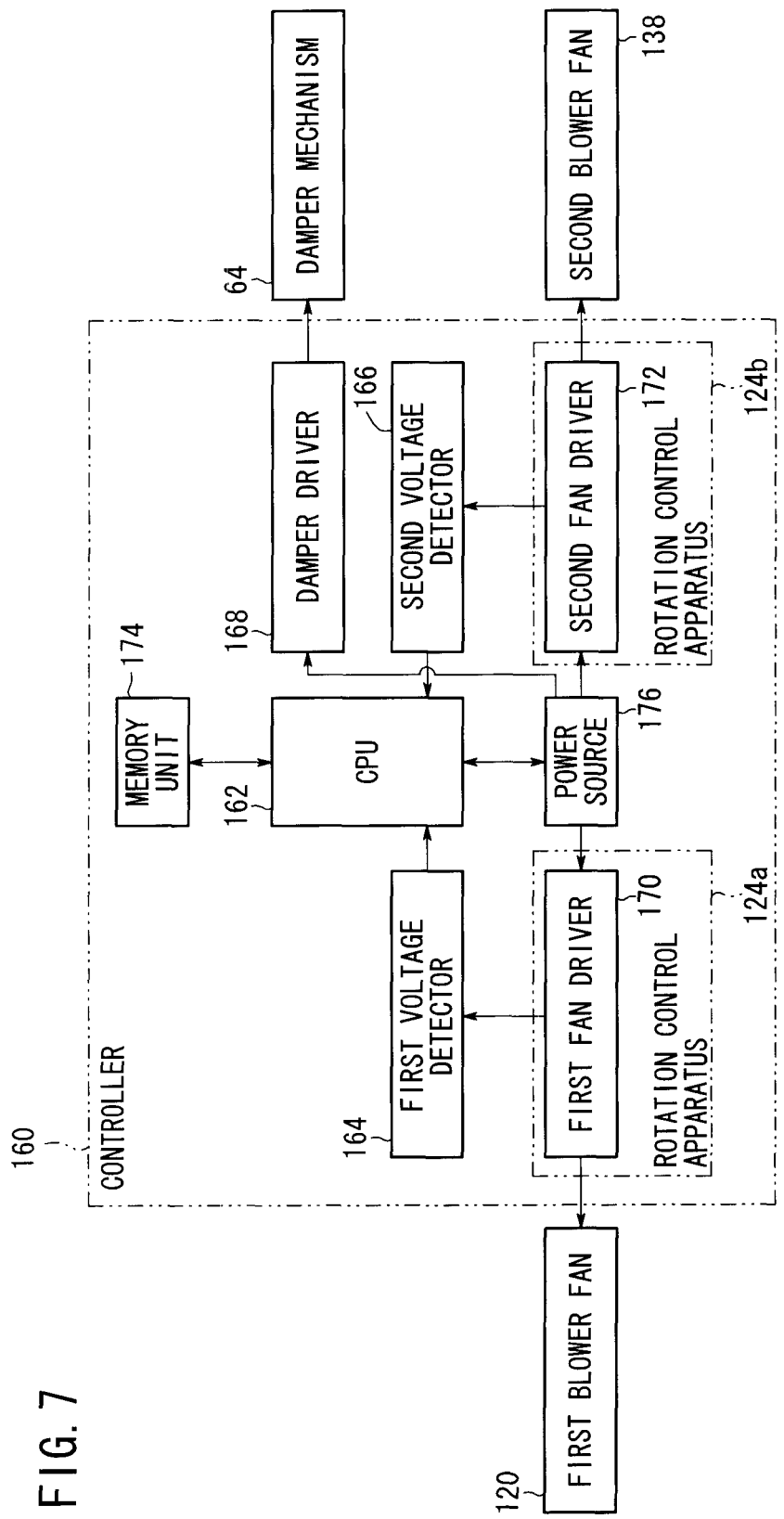
FIG. 7 is an outline block diagram of a controller.

As shown in FIG. 7, the controller 160 includes a CPU (Central Processing Unit) 162 that serves as a main controller, a first fan driver 170 for driving the first blower fan 120, a second fan driver 172 for driving the second blower fan 138, a first voltage detector 164 for detecting the load voltage V1 supplied to the first fan driver 170, a second voltage detector 166 for detecting the load voltage V2 supplied to the second fan driver 172, a damper driver 168 for driving the damper mechanism 64, a memory means 174 constituted by a RAM (Random Access Memory) 149 and a ROM (Read Only Memory), and a power source 176 that supplies power to the damper driver 168 and to the first and second fan drivers 170, 172. Each of the aforementioned functional elements are implemented by the CPU 162, which reads in a program, and by effecting software processing in cooperation with the memory means 174. The first fan driver 170 may be incorporated into a rotation control apparatus 124a, and the second fan driver may be incorporated into a rotation control apparatus 124b.

A first air flow rate A1, which represents a flow rate of the first air corresponding to one rotation of the first blower fan 120, a second air flow rate A2, which represents a flow of the second air corresponding to one rotation of the second blower fan 138, an electrical resistance R1 of the first blower fan 120, and an electrical resistance R2 of the second blower fan 138 are stored beforehand in the memory means 174. However, the data stored in the memory means 174 is not necessarily limited to these items.

In the case that data of the load voltage V2 received by the CPU 162 is such that V2<Vc, i.e., in the case that the second blower fan 138 is not rotated (n2=0), the ventilation switching damper 136 constituting the damper mechanism 64 is rotated by an instruction from the CPU 162, and by power being supplied to the damper driver 168 from the power source 176, whereby the second intake port 128 is blocked (see FIG. 5). Consequently, by supplying first air from the first front passage 74, through the communication opening 134, past the first rear passage 130, and to the second cooling section 78, freezing and adhering of water droplets, which occur on the surface of the second cooling section 78, can be prevented. Further, by blocking the second intake port 128, noises in the vehicle compartment, the possibility of which is caused by air inside the casing 52 backflowing and reaching the second blower fan 138 of the second blower unit 62, can be reduced insofar as possible.

Further, concerning the load voltage V2, in the case that a predetermined voltage value Vf (where Vc<Vf<Vd, as shown in FIG. 6B) is set beforehand in the memory means 174, and the data of the load voltage V2 received by the CPU 162 is such that Vc≤V2<Vf, i.e., in the case that the rotational velocity n2 of the second blower fan 138 is set slowly, the CPU 162 sends an instruction to the damper driver 168, whereby the ventilation switching damper 136 is rotated corresponding to the load voltage V2. Accordingly, the communication opening 134 is opened, and a portion of the first air from the first blower fan 120 is delivered from the first front passage 74, past the communication opening 134 and the first rear passage 130, and to the second cooling section 78 of the evaporator 58, and furthermore, the second air from the second blower fan 138 also is supplied past the second intake port 128 and from the first rear passage 130 to the second cooling section 78, whereby freezing and adhering of water droplets, which occur on the surface of the second cooling section 78, can be prevented (see FIG. 5).

Further, in the case that the data of the load voltage V2 received by the CPU 162 is such that Vf≤V2≤Vd, i.e., in the case that the rotational velocity n2 of the second blower fan 138 is sufficiently assured, the CPU 162 sends an instruction to the damper driver 168, thereby rotating the ventilation switching damper 136 to block the communication passage 134 (see FIG. 5).

Moreover, in the case that the data of the load voltage V1 received by the CPU 162 is such that V1=Vb, the CPU 162 constantly sends an instruction to the damper driver 168, so that the ventilation switching damper 136 is rotated to block the communication passage 134 (see FIG. 5). That is, in the case that V1=Vb, for example in the case of the defroster mode, the first blower fan 120 is operated at maximum power to rapidly introduce external air, so that fog (condensation) is eliminated from the front window of the vehicle, and visibility of occupants in the vehicle is suitably assured.

Next, an explanation shall be made concerning drive controls for the first blower fan 120 and the second blower fan 138.

Figure 8:
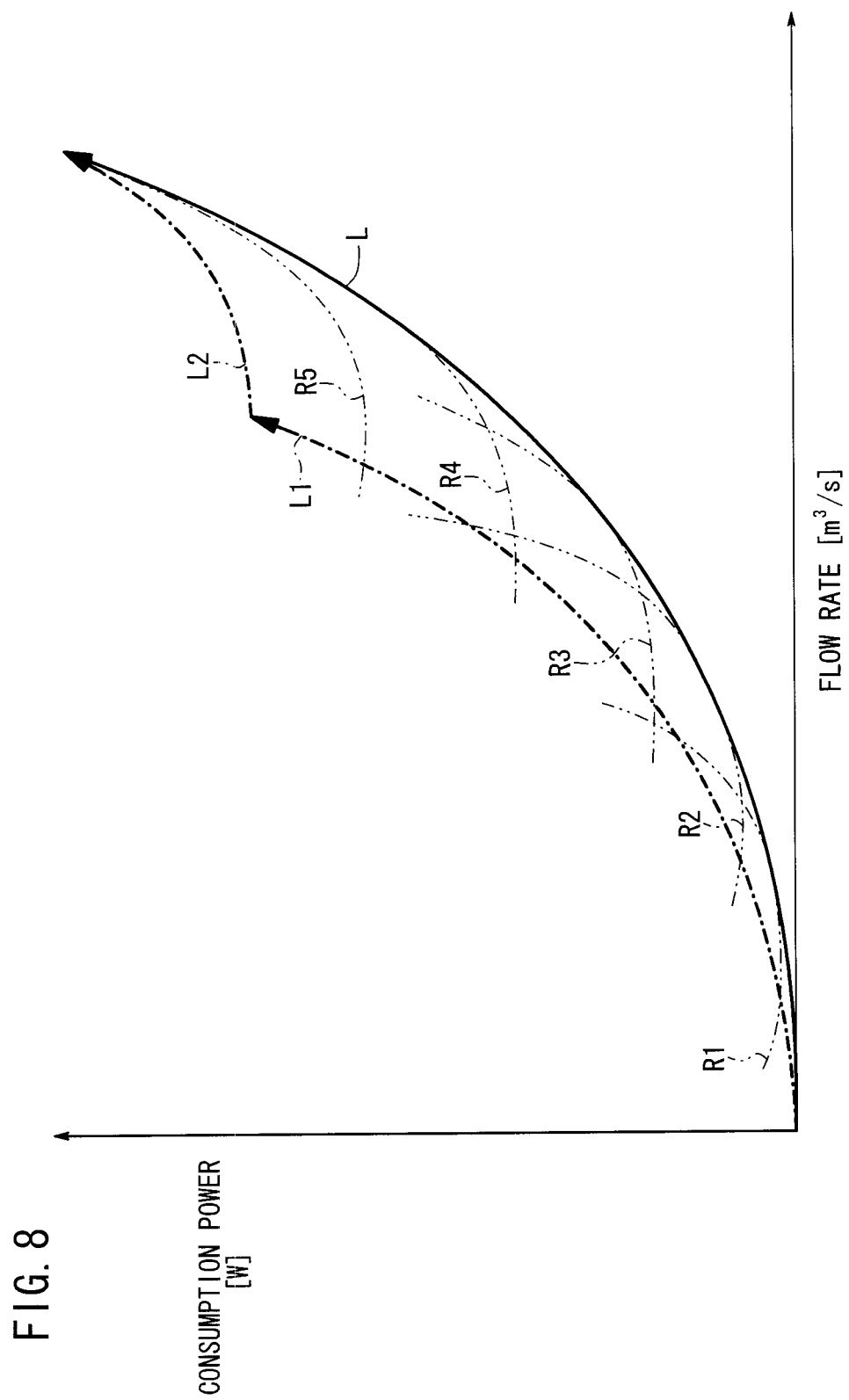
FIG. 8 is a graph of a characteristic curve showing a relationship between a flow rate of air supplied to a casing interior from the first and second blower fans, and electrical power consumption of the first and second blower fans.

The drive controls for the first blower fan 120 and the second blower fan 138 are carried out so that, while the supply rate (flow rate of air) of the first air and second air supplied to the casing 52 is maintained at a necessary predetermined flow rate, the sum of the first power consumption W1 required to drive the first blower fan 120 and the second power consumption W2 required to drive the second blower fan 138 is minimized (refer to the solid line L in FIG. 8).

Herein, the flow rate of air when the first blower fan 120 is driven independently can be regarded as the product of the first air flow rate A1 and the rotational speed n1. Further, as shown in FIG. 6A, the rotational velocity n1 is roughly proportional to the load voltage V1. Similarly, concerning the second blower fan 138, the flow rate of air when the second blower fan 138 is driven independently can be regarded as the product of the second air flow rate A2 and the rotational speed n2, and as shown in FIG. 6B, the rotational velocity n2 is proportional to the load voltage V2.

Further, the first power consumption W1 of the first blower fan 120 is proportional to the square of the load voltage V1, and reversely proportional to the electrical resistance R1. Similarly, the second power consumption W2 of the second blower fan 138 is proportional to the square of the load voltage V2, and reversely proportional to the electrical resistance R2.

The drive start voltage Va of the first blower fan 120, the maximum rated voltage Vb, the rotational velocity nb when the voltage Vb is applied, the first air flow rate A1 and the electrical resistance R1 can be regarded substantially as fixed values determined for each of the modes by the characteristics of the first blower fan 120. Furthermore, the drive start voltage Vc of the second blower fan 138, the maximum rated voltage Vd, the rotational velocity nd when the voltage Vd is applied, the second air flow rate A2 and the electrical resistance R2 can be regarded substantially as fixed values determined for each of the modes by the characteristics of the second blower fan 138. Accordingly, the consumption power W1 and the flow rate of air when the first blower fan 120 is driven independently is determined by the load voltage V1, and further, the consumption power W2 and the flow rate of air when the second blower fan 138 is driven independently is determined by the load voltage V2. That is, the drive controls for the first blower fan 120 and the second blower fan 138 are affected by controlling the load voltages V1, V2.

Figure 9:
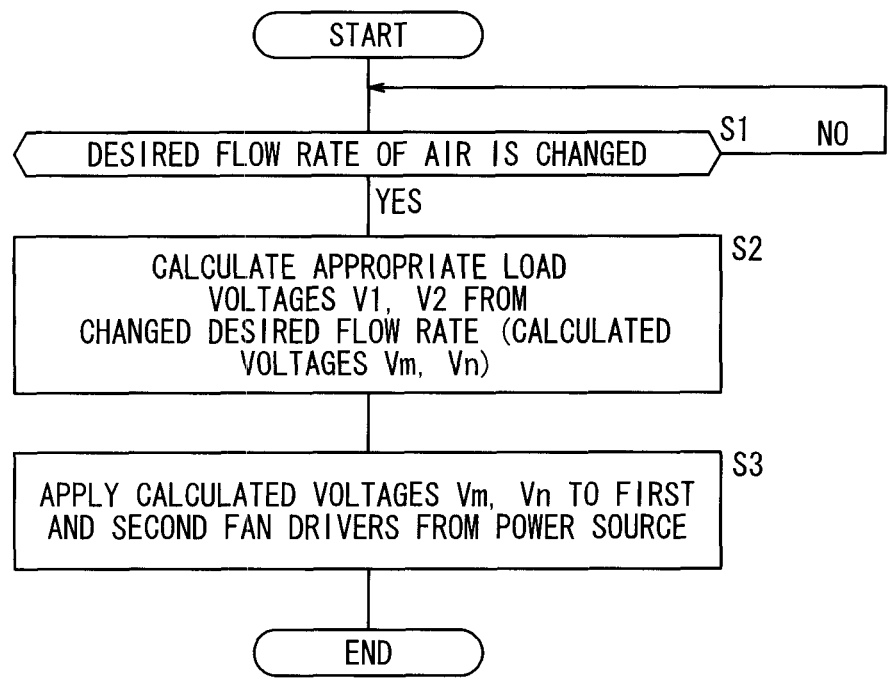
FIG. 9 is a flowchart of a drive control sequence of the first and second blower fans.

Control of the load voltages V1, V2 shall be described below with reference to FIG. 9. As described previously, the first voltage detector 164 detects the load voltage V1 supplied to the first fan driver 170, whereas the second voltage detector 166 detects the load voltage V2 supplied to the second fan driver 172.

In step S1, by an operation in the vehicle compartment performed by an occupant therein, the desired flow rate of air is changed. It will be appreciated that step S1 also is effected in the case that the vehicular air conditioning apparatus 50 is switched from an OFF state to an ON state. In the case that the desired flow rate of air is not changed, the sequence returns to step S1.

In step S2, from the desired flow rate of air, which has been changed, the CPU 162 of the controller 160 calculates a suitable load voltage V1 to be applied to the first blower fan 120, so as to reduce the sum of the consumption power of the first and second blower fans 120, 138 and thereby produce a calculated voltage Vm. Similarly, the controller 160 calculates a suitable load voltage V2 to be applied to the second blower fan 138, thereby producing a calculated voltage Vn.

In step S3, by an instruction from the CPU 162, by applying the calculated voltage Vm from the power source 176 to the first fan driver 170, the rotational velocity n1 of the first blower fan 120 is changed. Similarly, based on an instruction from the CPU 162, by applying the calculated voltage Vn from the power source 176 to the second fan driver 172, the rotational velocity n2 of the second blower fan 138 is changed. As a result, by controlling the load voltages V1, V2, desired flow rates, which have been changed, can be obtained.

As noted previously, the first consumption power W1 is determined by the load voltage V1, whereas the second consumption power W2 is determined by the load voltage V2, and the load voltages V1, V2 are controlled. Thus, driving of the first blower fan 120 and the second blower fan 138 can be controlled. As a result, as shown in FIG. 8, compared to the case where the first fan driver 170 independently drives the first blower fan 120 (refer to the broken line L1 in FIG. 8), and successively, the second fan driver 172 independently drives the second blower fan 138 (refer to the broken line L2 in FIG. 8), driving of the first and second blower fans 120, 138 can be controlled so as to reduce the sum of the consumption powers of the first and second blower fans 120, 138, i.e., the sum of the first consumption power W1 and the second consumption power W2 by utilizing the first and second fan drivers 170, 172, whereby the first air and the second air can be supplied efficiently at a desired air flow rate. The characteristic curve L, for example, may be characterized by regions in which the consumption power within respective characteristic curves R1 to R5, which are obtained for a case where the voltage of the first blower fan 120 is fixed and the voltage of the second blower fan 138 is changed, is low. Further, in FIG. 8, the characteristic curve R1 indicates a case in which the voltage of the first blower fan 120 is maintained at 4V, whereas the voltage of the second blower fan 138 is changed from 4V to 8V, the characteristic curve R2 indicates a case in which the voltage of the first blower fan 120 is maintained at 6V, whereas the voltage of the second blower fan 138 is changed from 4V to 8V, the characteristic curve R3 indicates a case in which the voltage of the first blower fan 120 is maintained at 8V, whereas the voltage of the second blower fan 138 is changed from 6V to 10V, the characteristic curve R4 indicates a case in which the voltage of the first blower fan 120 is maintained at 10V, whereas the voltage of the second blower fan 138 is changed from 8V to 10V, and the characteristic curve R5 indicates a case in which the voltage of the first blower fan 120 is maintained at 12V, whereas the voltage of the second blower fan 138 is changed from 10V to 13.5V.

The aforementioned controls may also be performed based on storing an appropriate drive voltage data map beforehand in the memory means 174, by which drive voltages are applied to the first and second blower motors 121, 141 corresponding to rotation numbers (RPS) for each of the respective blow-out modes.

In the foregoing manner, according to the first embodiment, in a vehicular air conditioning apparatus having a first blower unit 56, a second blower unit 62, a casing 52 in which a second rear passage 142 and a second front passage 80 through which air from the first blower unit 56 and the second blower unit 62 passes, and an evaporator 58 and a heater core 60 disposed in the interior of the casing 52, the casing 52 is made up from a first divided casing 66 and a second divided casing 68 disposed about the center plate 70, including a second rear passage 142a and a second front passage 80a in the first divided casing 66, and a second rear passage 142b and a second front passage 80b in the second divided casing 68. Switching dampers 146a, 146b also are provided, which are capable of blocking communication between a passage through which air flows to a first row of seats and a passage through which air flows to second and subsequent rows of seats with respect to the running direction of the vehicle.

Consequently, the blowing rate and blowing temperature of air to the driver's seat side and the passenger seat side in the vehicle are capable of being distributed independently of one another.

Next, a vehicular air conditioning apparatus 200 according to a second embodiment is shown in FIGS. 10 through 14.

Figure 10:
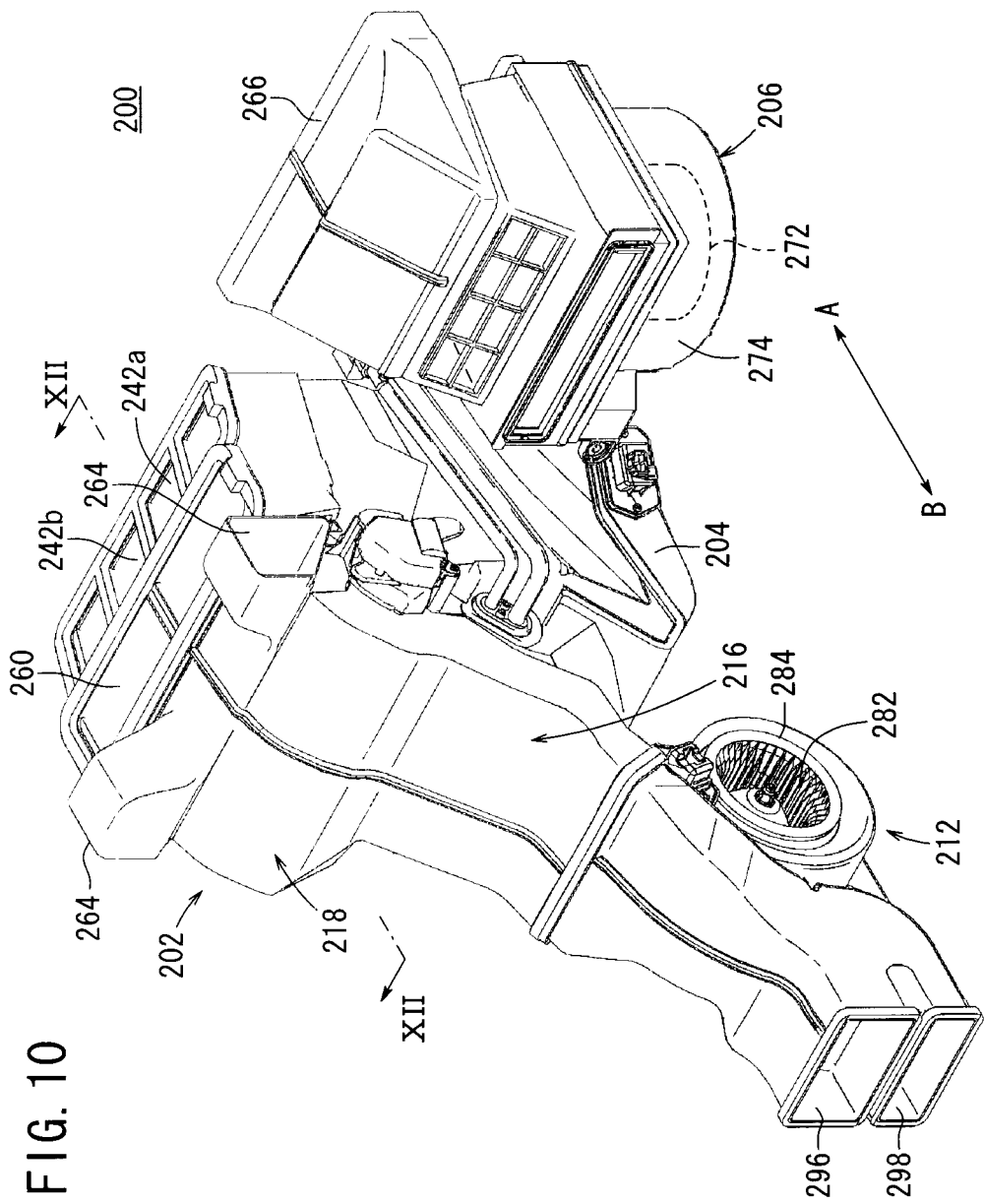
FIG. 10 is an external perspective view of a vehicular air conditioning apparatus according to a second embodiment of the present invention.
Figure 11:
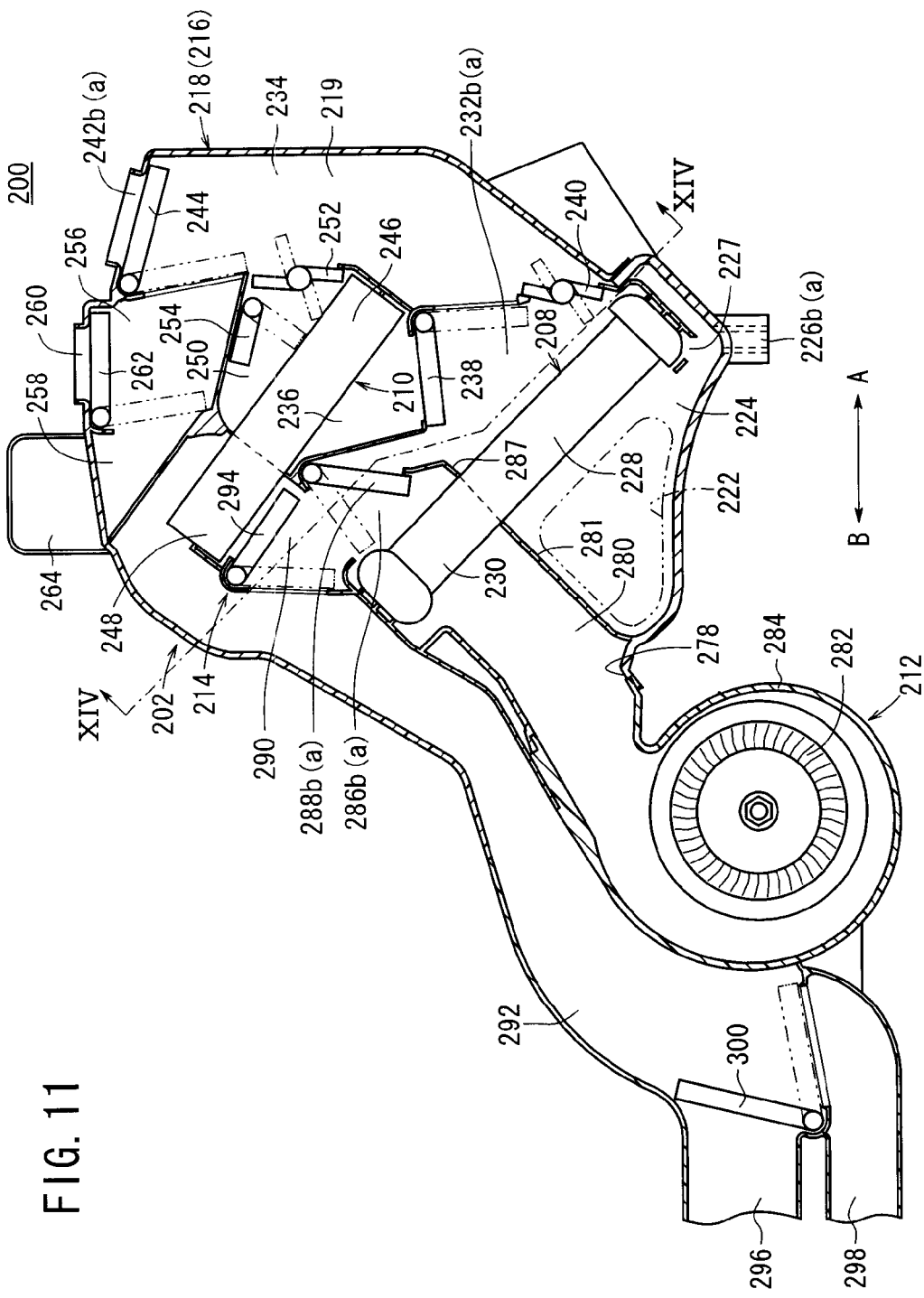
FIG. 11 is an overall cross sectional view of the vehicular air conditioning apparatus shown in FIG. 10.

As shown in FIGS. 10 and 11, the vehicular air conditioning apparatus 200 includes a casing 202 constituted by respective air passages, a first blower unit 206 connected through FL connection duct 204 to a side portion of the casing 202 for blowing air toward the front seat side of the vehicle, an evaporator (cooling means) 208 arranged inside the casing 202 for cooling air, a heater core (heating means) 210 for heating air, a second blower unit 212 connected to a lower portion of the casing 202 for blowing the air toward the middle and rear seats of the vehicle, and a damper mechanism 214 for switching the flow of air that flows through and inside each of the respective passages.

The casing 202 is constructed from first and second divided casings 216, 218 having substantially symmetrical shapes, and a center plate 219 disposed between the first divided casing 216 and the second divided casing 218. A first intake port 222 connected to the connection duct 204, and to which air is supplied from the first blower unit 206, is formed at a lower side portion of the first divided casing 216. The first intake port 222 communicates with a first front passage 224 disposed on an upstream side of the evaporator 208.

As shown in FIG. 11, the evaporator 208, which is disposed on the downstream side of the first front passage 224, is disposed to straddle between the first divided casing 216 and the second divided casing 218. One end thereof in the forward direction of the vehicle (the direction of arrow A) is inclined downward at a predetermined angle with respect to the other end thereof in the rearward direction (the direction of arrow B) of the vehicle.

The evaporator 208 includes a first cooling section 228 that faces the first front passage 224 and which cools air that is supplied from the first front passage 224, and a second cooling section 230 that faces a later-described first rear passage 280 and which cools air that is supplied from the first rear passage 280. The first cooling section 228 and the second cooling section 230 are separated by a non-illustrated partitioning means, so that air flowing from the first front passage 224 into the evaporator 208 and air flowing from the first rear passage 280 into the evaporator 208 do not mix together mutually inside the evaporator 208.

On the other hand, a second front passage 232 supplied with air that has passed through the first cooling section 228 is formed on the downstream side of the evaporator 208. Upwardly of the second front passage 232, a third front passage 234 and a fourth front passage 236 are formed in a branching or bifurcated fashion. Further, a first air mixing damper 238 is disposed rotatably in the second front passage 232, so as to face toward the branching portion of the third front passage 234 and the fourth front passage 236. By rotation of the first air mixing damper 238, the blowing condition and blowing rate of the cooled air that has passed through the evaporator 208 into the third front passage 234 and the fourth front passage 236 is adjusted. The third front passage 234 is arranged in a forward direction (the direction of arrow A), whereas the fourth front passage 236 is arranged in a rearward direction (the direction of arrow B), of the casing 202. The heater core 210 is disposed on a downstream side of the fourth front passage 236.

Upstream of the third front passage 234, a cooling vent damper 240 is disposed in a downward direction facing the second front passage 232. The cooling vent damper 240 is formed from a butterfly valve, which is rotatable about a central axis, for switching a communication state between the second front passage 232 and the third front passage 234. More specifically, because the cooling vent damper 240 is arranged in the vicinity of the evaporator 208, the cooling vent damper 240 is disposed such that, under a switching action thereof, chilled air cooled by the evaporator 208 is supplied directly into the third front passage 234.

Further, the third front passage 234 extends upwardly, and a first vent blow-out port 242 opens at an upper portion on the downstream side thereof, where a vent damper 244 is rotatably disposed. The vent damper 244 switches a blowing state of air that flows through the third front passage 234, when air is blown to the first vent blow-out port 242 and to a later-described sixth front passage 256, and also is capable of adjusting the blowing rate thereof.

The heater core 210, similar to the evaporator 208, is arranged so as to straddle between the first divided casing 216 and the second divided casing 218, and is disposed such that one end thereof in the forward direction of the vehicle (the direction of arrow A) is inclined downward at a predetermined angle with respect to the other end thereof in the rearward direction (the direction of arrow B) of the vehicle. The heater core 210 includes a first heating section 246 that faces the fourth front passage 236 and which heats air that is supplied from the fourth front passage 236, and a second heating section 248 that faces a third rear passage 290 (to be described later) and which heats air that is supplied from the third rear passage 290. The first heating section 246 and the second heating section 248 are separated by a non-illustrated partitioning means, so that air flowing from the fourth front passage 236 to the heater core 210 and air flowing from the third rear passage 290 to the heater core 210 do not mix together mutually inside the heater core 210.

On the downstream side of the heater core 210, a fifth front passage 250 first passage) is formed. The fifth front passage 250 extends in the forward direction (in the direction of arrow A), and at a location that merges with the downstream side of the third front passage 234, temperature control dampers 252a, 252b are provided, and together therewith, a sub-defroster damper 254 is disposed in an upward direction facing the heater core 210. The temperature control dampers 252a, 252b, similar to the cooling vent damper 240, are formed from a butterfly valve rotatable about a central axis, for switching a communication state between the fifth front passage 250 and the third front passage 234 upon rotation thereof, and for deflecting the blowing direction of warm air supplied from the fifth front passage 250 into the third front passage 234.

On the other hand, the sub-defroster damper 254 is disposed so as to be capable of switching a communication state between the fifth front passage 250 and the sixth front passage 256 (second passage) formed thereabove. By rotating the sub-defroster damper 254 and thereby establishing communication between the fifth front passage 250 and the sixth front passage 256, that is, by shortening the flow path from the fifth front passage 250 to the sixth front passage 256, in a state in which air resistance is reduced, warm air heated by the heater core 210 can be supplied directly to the sixth front passage 256 without flowing through the third front passage 234. Owing thereto, in the case that the heat mode for blowing air in the vicinity of the feet of passengers, or the defroster mode for blowing air in the vicinity of the front window of the vehicle, is selected, the blowing rate can be increased to quickly heat such areas. Stated otherwise, by reducing the influence of ventilation resistance by bending the passage, even without increasing the rotation of the first blower unit 206, the blowing rate of air in the heat mode for blowing air in the vicinity of the feet of passengers, or in the defroster mode for blowing air in the vicinity of the front window of the vehicle, can be increased. Furthermore, since the flow path from the fifth front passage 250 to the sixth front passage 256 is shortened, loss of heat from the warm air heated by the heater core 210 is reduced as much as possible when air is blown from the defroster blow-out port 260 to the front seats, resulting in increased heating performance in the heat mode and the defroster mode. Moreover, by arranging the sub-defroster damper 254 upwardly of the heater core 210, and arranging the defroster blow-out port 260 further upwardly thereof, the flow of warm air is made substantially linear, such that the ventilation resistance when the warm air flows therethrough can be reduced even more.

The sixth front passage 256 communicates with the downstream side of the third front passage 234 through the forwardly disposed opening, and communicates with a seventh front passage 258 through the opening disposed rearward. Further, a defroster blow-out port 260 opens upwardly of the sixth front passage 256, and a defroster damper 262 is disposed rotatably facing the defroster blow-out port 260. The defroster damper 262 switches the blowing state of air that is supplied to the sixth front passage 256 from the third and fifth front passages 234, 250 when air is blown to the defroster blow-out port 260 and to the seventh front passage 258, and further is provided to enable the blowing rate thereof to be adjusted.

More specifically, with the vehicular air conditioning apparatus 200, the first vent blow-out port 242 and the defroster blow-out port 260 open upwardly of the casing 202, and are disposed substantially centrally in the casing 202, with the first vent blow-out port 242 being positioned on the forward side (in the direction of arrow A), and the defroster blow-out port 260 being positioned rearwardly thereof (in the direction of arrow B) with respect to the first vent blow-out port 242.

The seventh front passage 258 communicates with a first heat blow-out port (not shown) for blowing air through a heat passage 264 in the vicinity of the feet of passengers riding in the front seats (driver's seat, passenger seat) of the vehicle compartment.

Figure 13:
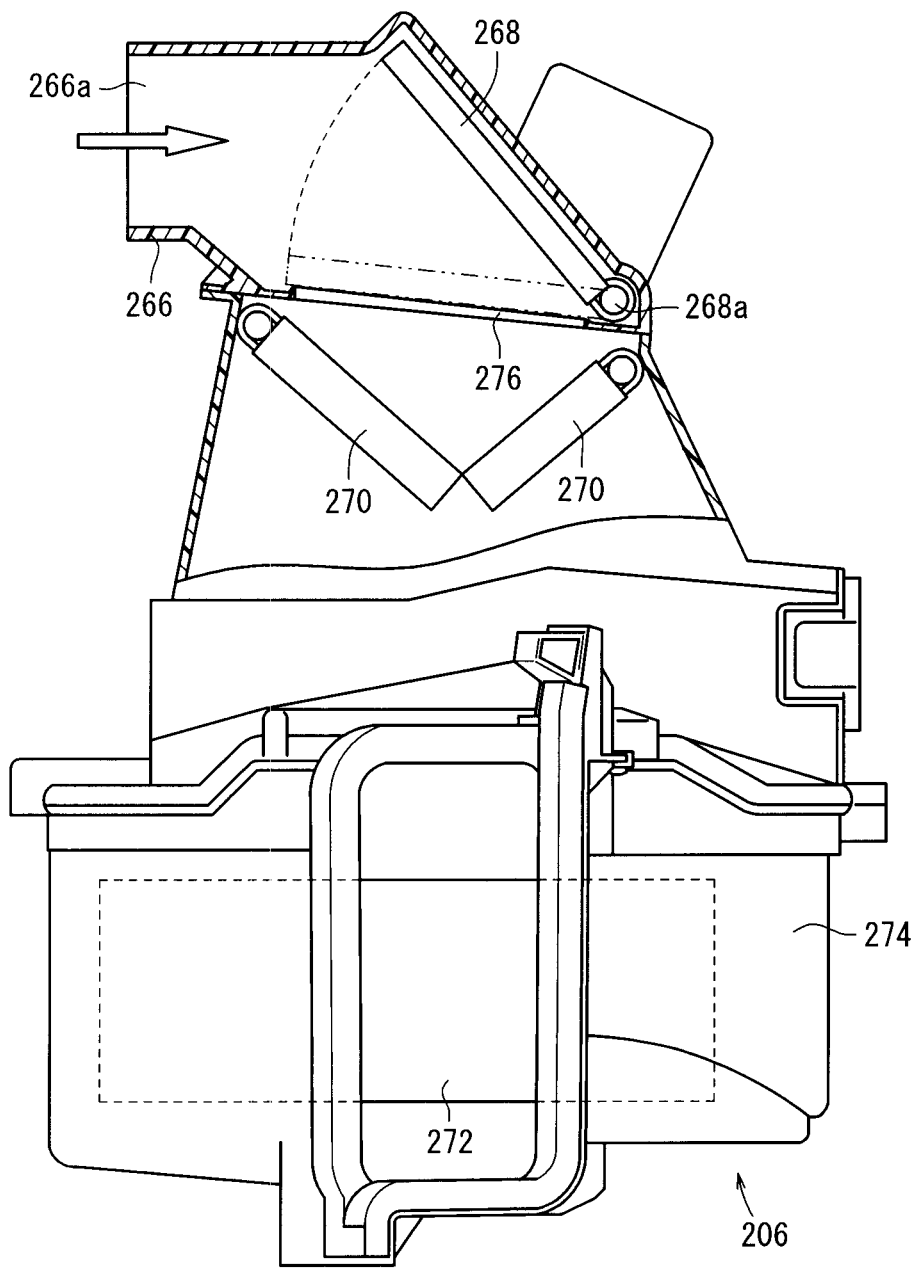
FIG. 13 is an enlarged side view of a first blower unit in the vehicular air conditioning apparatus of FIG. 10.

As shown in FIGS. 10 and 13, the first blower unit 206 comprises an adjustment damper 268 disposed in the inlet of a duct 266 for introducing exterior air, for adjusting the intake rate of air taken in through the duct 266, an intake damper 270 disposed on a downstream side of the adjustment damper 268 for carrying out switching between interior and exterior air, and a first blower fan 272 for supplying air taken in from the duct 266 or the like to the interior of the casing 202. A blower case 274 in which the first blower fan 272 is accommodated is connected with the connection duct 204, which in turn is connected to the first intake port 222, and communicates with the interior of the casing 202. Rotation of the first blower fan 272 is controlled by a fan motor (not shown), which is driven by supply of electrical power thereto.

The adjustment damper 268 is disposed to face toward an opening 266a of the duct 266, and is openable and closable under an urging action of a non-illustrated rotary power source via a support shaft (axis of rotation) 268a, which is supported on the downstream side of the duct 266. Stated otherwise, the adjustment damper 268 is disposed so as to confront the direction in which the exterior air is introduced. In addition, through rotation of the adjustment damper 268 by a predetermined angle upwardly from the closed condition blocking a communication hole 276 (the state shown by the two-dot-dash line in FIG. 13), which opens on an upper surface of the blower case 274, the flow rate of intake air to the side of the blower case 274 through the adjustment damper 268 and the communication hole 276 is adjusted. Moreover, an end on the opposite side of the adjustment damper 268 from the support shaft 268a is arranged to face toward and confront the air that is drawn in from the duct 266. More specifically, since the flow of air that is drawn in from the duct 266 is substantially parallel with the adjustment damper 268, air pressure is not received in a direction perpendicular with respect to the flat surface of the adjustment damper 268, and the adjustment damper 268 can be rotated without requiring a large driving force. In this case, the direction of extension of the duct 266 and the adjustment damper 268 may be arranged substantially in parallel.

For example, the running speed of the vehicle is detected by a vehicle speed sensor (not shown), and by adjusting the rotation angle (rotation amount) of the adjustment damper 268 based on the running speed, the flow rate of air that is introduced into the casing 202 from the exterior of the vehicle through the duct 266 is controlled to attain a fixed rate independently of the vehicle running speed.

More specifically, when the vehicle runs at a high speed, since the rate of air taken in from the duct 266 increases, the opening degree of the adjustment damper 268 is made smaller, and the flow rate of air (external air) supplied to the side of the blower case 274 is restricted. On the other hand, when the vehicle runs at a low speed, since the rate of air taken in from the duct 266 decreases compared to when the vehicle runs at a high speed, the opening degree of the adjustment damper 268 is controlled to become larger, so that a greater amount of air (external air) is taken into the interior of the blower case 274.

The relationship between the vehicle velocity and the angle of rotation of the adjustment damper 268 may be determined from measurement data, or may also be determined by a numerical analytic method from a value Cd representing a drag coefficient of the air, or a Bernoulli equation or the like, which represents a law of energy conservation relating to the fluid.

As described above, air that is supplied from the first blower unit 206 is introduced to the interior of the casing 202 through the connection duct 204 and the first intake port 222, and under rotating actions of the first air mixing damper 238, the vent damper 244, the defroster damper 262, the temperature control dampers 252a, 252b and the sub-defroster damper 254, which collectively constitute the damper mechanism 214, air is supplied selectively to the defroster blow-out port 260, the first vent blow-out port 242 and the heat passage 264, which are capable of blowing air to the front and middle seats inside the vehicle through the first through seventh front passages 224, 232, 234, 236, 250, 256 and 258.

On the other hand, in a lower portion of the casing 202, as shown in FIG. 11, a second intake port 278 through which air is supplied from the second blower unit 212 is formed at a rearward side (in the direction of arrow B) perpendicular to the first intake port 222. The second intake port 278 opens at a position on an upstream side of the evaporator 208, and communicates with the first rear passage 280, and further, is formed alongside the first intake port 222 via the first rear passage 280 and a first dividing wall 281.

The second blower unit 212 includes a second blower fan 282, which takes in air (internal air) from the vehicle compartment and supplies the intake air into the interior of the casing 202. A blower case 284 in which the second blower fan 282 is accommodated is connected to the second intake port 278 of the casing 202, and communicates with the first rear passage 280. In the same manner as the first blower fan 272, rotation of the second blower fan 282 is controlled by a fan motor (not shown), which is driven by supply of electrical power thereto.

On a downstream side of the first rear passage 280, a second rear passage 286 is formed through which air having passed through the second cooling section 230 of the evaporator 208 is supplied. The second rear passage 286 is separated from the second front passage 232 by a second dividing wall 287, wherein the second dividing wall 287 extends to a partition means of the evaporator 208. Owing thereto, on the downstream side of the evaporator 208 as well, air that passes through the first rear passage 280 and flows to the second cooling section 230 of the evaporator 208 does not intermix mutually with air that passes through the first front passage 224 and flows to the first cooling section 228 of the evaporator 208.

Figure 12:
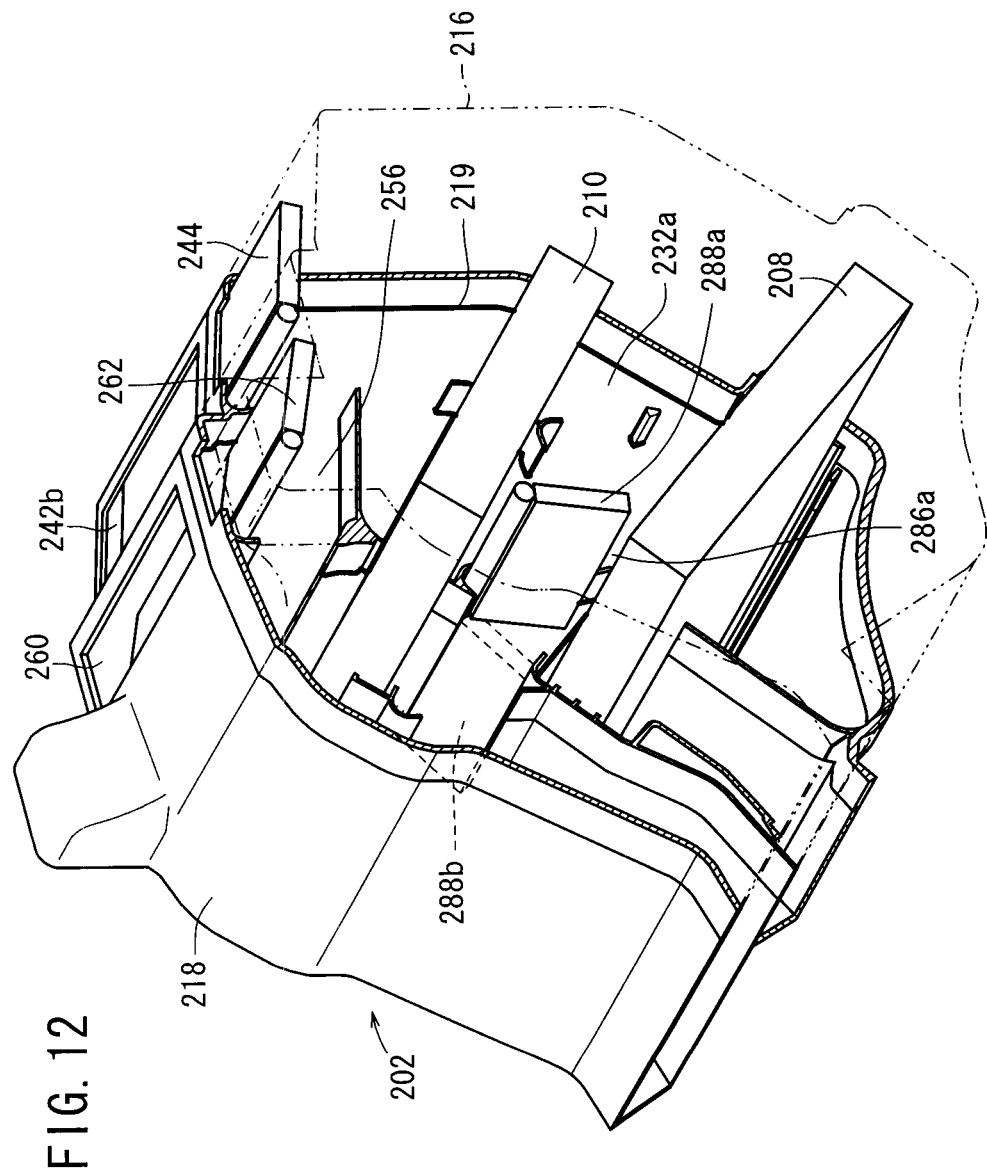
FIG. 12 is a cross sectional view taken along line XII-XII of FIG. 11.
Figure 14:
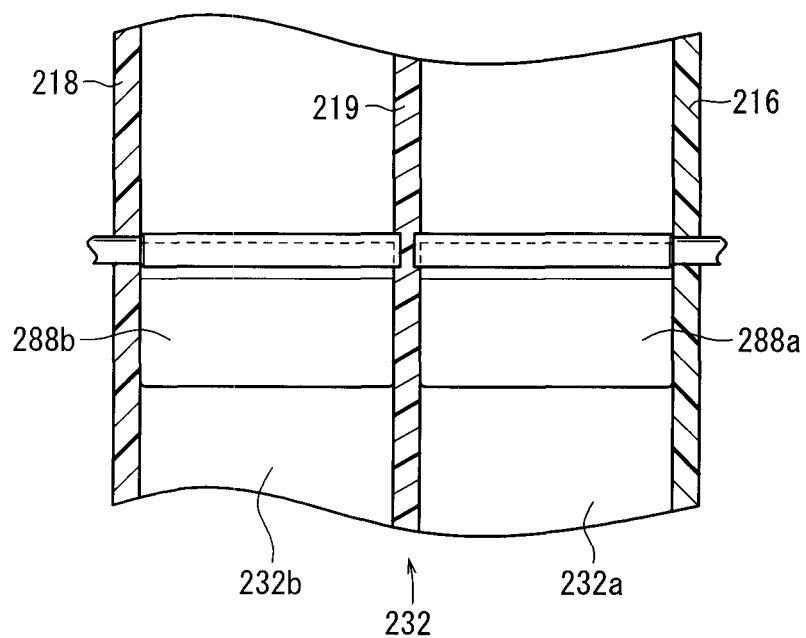
FIG. 14 is a partial cross sectional view taken along line XIV-XIV of FIG. 11.

Herein, as shown in FIG. 12, the second rear passage 286 and the second front passage 232 are separated respectively on sides of the first and second divided casings 216, 218 about a center plate 219, which is disposed in the center of the casing 202, thereby forming a second rear passage 286a and a second rear passage 286b, a second front passage 232a and a second front passage 232b, and a first vent blow-out port 242a and a first vent blow-out port 242b. Furthermore, as shown in FIG. 14, a pair of communication switching dampers 288a, 288b, which are capable of switching communication states with the second front passage 232a and the second front passage 232b, are disposed in the second rear passage 286a and the second rear passage 286b, wherein one of the communication switching dampers 288a is rotatably controlled separately and independently from the other communication switching damper 288b.

In addition, by rotation of the pair of communication switching dampers 288a, 288b, the second rear passage 286 for blowing air to the middle and rear seats in the vehicle compartment and the second front passage 232 for blowing air to the front seats in the vehicle compartment are brought into mutual communication with each other. Together therewith, by changing, respectively, the rotation amount of one of the communication switching dampers 288a and the rotation amount of the other of the communication switching dampers 288b, for example, the blowing rate of air blown to the passenger seat side of the front seats through the second front passage 232a and from the first vent blow-out port 242a, and the blowing rate of air blown to the driver's seat side of the front seats through the second front passage 232b and from the first vent blow-out port 242a, as well as the blowing temperatures thereof, can be controlled separately from each other.

On a downstream side from the second rear passage 286, a third rear passage 290 facing the heater core 210 is formed. The third rear passage 290 opens onto a side of the heater core 210, and further, opens alongside a fourth rear passage 292 adjacent thereto. In addition, a second air mixing damper 294, which mixes at a predetermined mixing ratio cool air and warm air supplied to the third rear passage 290, to thereby form mixed air, is disposed rotatably in the third rear passage 290. The second air mixing damper 294 switches the communication state between the third rear passage 290 and the upstream or downstream side of the fourth rear passage 292, which is connected to a downstream side of the heater core 210. Consequently, by rotating the second air mixing damper 294, cool air that is cooled by the evaporator 208 and supplied to the third rear passage 290 and warm air that is heated by the heater core 210 and which flows through the fourth rear passage 292 are mixed at a predetermined mixing ratio within the fourth rear passage 292, and are blown out therefrom.

In other words, an intermediate location of the fourth rear passage 292 functions as a mixing section for mixing warm air and cool air, which is then blown out to the middle seats and rear seats in the vehicle compartment.

Further, the fourth rear passage 292, after curving around so as to circumvent the end portion of the heater core 210, extends downwardly while curving to avoid an upper part of the second blower unit 212. Additionally, a downstream side of the fourth rear passage 292 communicates with the fifth and sixth rear passages 296, 298 at a branching location of the fifth and sixth rear passages 296, 298, at which a rotatable mode switching damper 300 is disposed. By rotating the mode switching damper 300, the communication state of the fourth rear passage 292 with the fifth or sixth rear passages 296, 298 is switched.

The fifth and sixth rear passages 296, 298 extend respectively in the rearward direction (the direction of arrow B) of the vehicle. The fifth rear passage 296 communicates with a second vent blow-out port (not shown), which serves to blow air in the vicinity of faces of passengers in the middle seats of the vehicle. On the other hand, the sixth rear passage 298 communicates with second and third heat blow-out ports (not shown) that serve to blow air in the vicinity of the feet of passengers in the middle and rear seats.

More specifically, air that is supplied from the second blower unit 212 is introduced to the interior of the casing 202 through the second intake port 278. The air then is selectively supplied to a second vent blow-out port, and to the second and third heat blow out ports (not shown), which are capable of blowing air to the middle seats and rear seats in the vehicle, through the first through sixth rear passages 280, 286, 290, 292, 296, 298, under rotary actions of the second air mixing damper 294 and the mode switching damper 300 that constitute the damper mechanism 214.

Moreover, because the aforementioned second to seventh front passages 232, 234, 236, 250, 256, 258 and the second rear passage 286 are divided in half at a substantially central portion of the casing 202 by the center plate 219, the second to seventh front passages 232, 234, 236, 250, 256, 258 and the second rear passage 286 are disposed respectively in the interiors of the first and second divided casings 216, 218.

The vehicular air conditioning apparatus 200 according to the second embodiment of the present invention is basically constructed as described above. Next, explanations shall be made concerning operations and effects of the present invention.

First, when operation of the vehicular air conditioning apparatus 200 is started, the first blower fan 272 of the first blower unit 206 is rotated upon supply of electricity thereto, and air (interior or exterior air) that is taken in through the duct 266 is supplied to the first front passage 224 of the casing 202 through the connection duct 204. Simultaneously, air (interior air) that is taken in by rotation of the second blower fan 282 of the second blower unit 212 upon supply of electricity with respect to a non-illustrated rotary drive source is supplied to the first rear passage 280 from the blower case 284 while passing through the second intake port 278. In the following descriptions, the air supplied to the interior of the casing 202 by the first blower fan 272 shall be referred to as "first air," and the air supplied to the interior of the casing 202 by the second blower fan 282 shall be referred to as "second air."

The first air and the second air supplied to the interior of the casing 202 are each cooled by passing respectively through the first and second cooling sections 228, 230 of the evaporator 208, and flow respectively as chilled air to the second front passage 232 and the second rear passage 286, in which the first air mixing damper 238 and the communication switching dampers 288a, 288b are disposed. In this case, because the interior of the evaporator 208 is divided into the first cooling section 228 and the second cooling section 230 by a non-illustrated partitioning means, the first air and the second air do not mix with one another.

Herein, for example, in the case that a vent mode is selected by a vehicle occupant for blowing air in the vicinity of the faces of passengers, due to the first air mixing damper 238 blocking communication between the second front passage 232 and the fourth front passage 236, the first air (cooled air) flows from the second front passage 232 and through the third front passage 234. In this case, since it is unnecessary for warm air that is supplied to the fifth front passage 250 to be mixed with respect to the cool air in the third front passage 234, the temperature control dampers 252a, 252b are rotated so as to be substantially parallel with the third front passage 234, thereby blocking communication between the fifth front passage 250 and the third front passage 234. In addition, since the vent damper 244 is rotated and communication between the third front passage 234 and the sixth front passage 256 is blocked, the first air (cooled air) that flows into the third front passage 234 is blown out from the opened first vent blow-out port 242 in the vicinity of the faces of passengers in the front seats in the vehicle compartment.

On the other hand, since the communication switching dampers 288a, 288b block communication between the second front passage 232 and the second rear passage 286, the second air (cooled air) flows from the second rear passage 286 and to the third rear passage 290. Furthermore, because the second air mixing damper 294 blocks the flow of second air to the heater core 210, the second air (cooled air) flows from the third rear passage 290, passing through the fourth rear passage 292, and to the downstream side. Additionally, under a switching action of the mode switching damper 300, second air (cooled air) that passes through the fifth rear passage 296 is blown from a second vent blow-out port (not shown) in the vicinity of the faces of passengers in the middle seats in the vehicle compartment.

Further, for example, in the vent mode, in the case that the vehicle compartment is to be cooled rapidly, the temperature control dampers 252a, 252b are rotated to become substantially parallel with the third front passage 234 and to block communication between the fifth front passage 250 and the third front passage 234. As a result, cooled air in the third front passage 234 can be supplied to the first vent blow-out port 242 without being raised in temperature. In addition, because the temperature control dampers 252a, 252b suppress flow passage resistance when cool air flows through the third front passage 234, low electrical power consumption of the first blower fan 272 is realized, along with reducing noise. Furthermore, the cooling vent damper 240, by establishing communication between the second front passage 232 and the third front passage 234, increases the blowing rate of the first air (cooled air) that flows from the second front passage 232 to the third front passage 234, thereby enabling the vehicle compartment to be cooled rapidly by the first air, which is blown out from the first vent blow-out port 242 and the second vent blow-out port (not shown).

Next, in the case that a bi-level mode is selected for blowing air in the vicinity of faces and feet of passengers in the vehicle compartment, the first air mixing damper 238 is rotated somewhat more toward the side of the third front passage 234 than the position thereof during the aforementioned vent mode. Furthermore, the temperature control dampers 252a, 252b are rotated, whereupon air heated by the heater core 210 is supplied into the third front passage 234 from the fifth front passage 250. At this time, the vent damper 244 is positioned at an intermediate position between the first vent blow-out port 242 and the opening of the sixth front passage 256, while the defroster blow-out port 260 is blocked by the defroster damper 262.

Further, one end of the temperature control dampers 252a, 252b, which are made up of butterfly valves, projects about the support shaft toward the side of the third front passage 234 (in the direction of arrow A), whereas the lower end side thereof is rotated to project toward the side of the fifth front passage 250 (in the direction of arrow B), and is tilted at a predetermined angle such that the third front passage 234 side thereof is inclined upwardly, and the fifth front passage 250 side thereof is inclined downwardly. Owing thereto, warm air is guided to the rearward side in the third front passage 234 along the temperature control dampers 252a, 252b, and the warm air, without being mixed with cooled air, is supplied to the heat passage 264 from the opened sixth front passage 256 and through the seventh front passage 258, and then is blown out in the vicinity of the feet of passengers riding in the front seats in the vehicle compartment from a first heat blow-out port (not shown).

On the other hand, because the first vent blow-out port 242 is disposed upwardly of the third front passage 234, a portion of the first air (cooled air) that passes through the evaporator 208 and is supplied from the second front passage 232 to the third front passage 234 is blown in the vicinity of the faces of passengers directly from the first vent blow-out port 242, without being mixed with the heated air.

More specifically, in the bi-level mode, because warm air can be guided suitably by the temperature control dampers 252a, 252b effectively to the side of the sixth front passage 256 that communicates with the first heat blow-out port (not shown), lowering in temperature of the warm air by mixing with cooled air can be suppressed. In addition, rising in temperature of the cooled air by mixing with the heated air can be suppressed as well. As a result, the temperature difference between the mixed air that is blown in the vicinity of faces of the passengers from the first vent blow-out port 242 and the mixed air that is blown in the vicinity of the feet of passengers from the first heat blow-out port is made greater, and comfort can be enhanced.

Furthermore, at the same time, the second air mixing damper 294 is rotated in a direction to separate slightly away from the heater core 210, and moreover, the mode switching damper 3100 is rotated to an intermediate position in the interior of the fourth rear passage 292. Additionally, concerning the second air, warm air that is heated by the heater core 210, and cooled air that is supplied from the third rear passage 290 to the fourth rear passage 292 through the opening are mixed together. The mixed air, after passing through the second vent blow-out port (not shown) from the fifth rear passage 296, is blown out in the vicinity of faces of passengers riding in the middle seats in the vehicle compartment, and together therewith, after passing through the third and fourth heat blow-out ports (not shown) from the sixth rear passage 298, is blown out in the vicinity of the feet of passengers riding in the middle and rear seats in the vehicle compartment.

Moreover, the sub-defroster damper 254 may be rotated so as to establish communication between the fifth front passage 250 and the sixth front passage 256. In accordance therewith, first air is added, which passes through the heater core 210 and is supplied to the sixth front passage 256 via the third front passage 234, and since the first air can be supplied directly into the sixth front passage 256, it is possible to increase the blowing rate of warm air that is blown from the first heat blow-out port (not shown) in the vicinity of the feet of passengers riding in the front seats of the vehicle compartment. Stated otherwise, warm air that is blown in the vicinity of the feet of passengers can be supplied at a more stable temperature.

Next, in the case that a heat mode is selected for blowing air in the vicinity of the feet of passengers in the vehicle compartment, in comparison to the bi-level mode, the first air mixing damper 238 is rotated further to the side of the third front passage 234. Further, the temperature control dampers 252a, 252b are rotated somewhat to place the third front passage 234 and the fifth front passage 250 in communication. Furthermore, the cooling vent damper 240 blocks communication between the second front passage 232 and the third front passage 234, and together therewith, the vent damper 244 and the defroster damper 262 are rotated respectively to block the first vent blow-out port 242 and the defroster blow-out port 260.

Consequently, heated first air that has passed through the heater core 210 is supplied from the fifth front passage 250 to the third front passage 234. First air (cooled air) and first air (heated air) are mixed together in the third front passage 234, whereupon the mixed air flows rearward through the sixth and seventh front passages 256, 258, is supplied to the heat passage 264, and is blown out from the non-illustrated first heat blow-out port in the vicinity of the feet of passengers riding in the front seats in the vehicle compartment.

Further, similar to the case of the aforementioned bi-level mode, the sub-defroster damper 254 may be rotated to establish communication between the fifth front passage 250 and the sixth front passage 256. In accordance therewith, since heated air that has passed through the heater core 210 can be supplied directly into the sixth front passage 256, it is possible to increase the blowing rate of the first air that is blown from the first heat blow-out port (not shown).

On the other hand, the second air mixing damper 294 is rotated in a direction to separate further away from the heater core 210 compared to the case of the bi-level mode, and further, the mode switching damper 300 is positioned to block the fifth rear passage 296. Consequently, the second air (mixed air) made up of cooled air and heated air which is mixed in the fourth rear passage 292, after passing through the sixth rear passage 298 from the fourth rear passage 292, is supplied to the second and third heat blow-out ports (not shown), where it is blown in the vicinity of the feet of passengers riding in the middle and rear seats in the vehicle compartment.

Next, an explanation shall be made concerning a heat/defroster mode, in which air is blown in the vicinity of the feet of passengers in the vehicle compartment and in the vicinity of the front window for eliminating fog (condensation) from the front window. In the case that the heat/defroster mode is selected, the defroster damper 262 is rotated in a direction to separate from the defroster blow-out port 260, and together therewith, the first vent blow-out port 242 is blocked by the vent damper 244 (refer to the solid line in FIG. 11). As a result, a portion of the first air (mixed air), which is mixed in the third front passage 234 and the sixth front passage 256, is blown in the vicinity of the front window of the vehicle through the defroster blow-out port 260, while the other portion of the first air (mixed air), after passing through the sixth and seventh front passages 256, 258, is blown in the vicinity of the feet of passengers in the front seats in the vehicle compartment from the heat passage 264 and the first heat blow-out port (not shown).

On the other hand, in the heat/defroster mode, in the case that second air is blown to the middle and rear seats in the vehicle compartment, handling thereof is carried out in the same manner as the above-described heat mode, and therefore detailed descriptions of this aspect of the heat/defroster mode are omitted.

Lastly, an explanation shall be made concerning a defroster mode, in which blowing of air only in the vicinity of the front window is carried out for eliminating fog (condensation) from the front window. In this case, the first air mixing damper 238 and the cooling vent damper 240 block communication between the second front passage 232 and the third front passage 234, and the vent damper 244 is rotated to block the first vent blow-out port 242. Consequently, heated first air that has passed through the heater core 210 is supplied from the fifth front passage 250, past the third front passage 234, and to the sixth front passage 256. Additionally, since the defroster damper 262 is rotated and communication is blocked between the sixth front passage 256 and the seventh front passage 258, the first air (warm air) is supplied from the sixth front passage 256 to the opened defroster blow-out port 260, and is blown in the vicinity of the front window of the vehicle. In this case, the defroster mode can be handled by blowing the first air only, which is supplied from the first blower unit 206, without driving the second blower unit 212.

Further, as mentioned above, under a switching action of the communication switching dampers 288a, 288b, by placing the second rear passage 286 and the second front passage 232 in communication, second air that is supplied from the second blower unit 212 can also be used for carrying out the defroster mode, by supplying the second air to the second front passage 232.

Still further, as mentioned above, by rotating the sub-defroster damper 254 in a direction to separate away from the sixth front passage 256, and thus directly placing the fifth front passage 250 and the sixth front passage 256 in communication, heated air that has passed through the heater core 210 may be supplied directly into the sixth front passage 256 without flowing through the third front passage 234. Consequently, the amount of warm air that is introduced to the sixth front passage 256 can be increased, and the blowing rate of air that is blown out from the defroster blow-out port 260 can be increased advantageously.

In the foregoing manner, according to the second embodiment, in a vehicular air conditioning apparatus having a first blower unit 206, a second blower unit 212, a casing 202 in which a second rear passage 286 and a second front passage 232 through which air from the first blower unit 206 and the second blower unit 212 is delivered, and an evaporator 208 and a heater core 210 disposed in the interior of the casing 202, the casing 202 is made up from the first divided casing 216 and the second divided casing 218 disposed about the center plate 220, including a second rear passage 286a and a second front passage 232a in the first divided casing 216, and a second rear passage 286b and a second front passage 232b in the second divided casing 218. Switching dampers 288a, 288b also are provided, which are capable of blocking communication between a passage through which air flows to a first row of seats and a passage through which air flows to second and subsequent rows of seats with respect to the running direction of the vehicle.

Consequently, the blowing rate and blowing temperature of air to the driver's seat side and the passenger seat side in the vehicle are capable of being distributed independently of one another.

The vehicular air conditioning apparatus according to the present invention is not limited to the above-described embodiments, and it is a matter of course that various modified or additional structures could be adopted without deviating from the essence and gist of the invention as set forth in the appended claims.

What is claimed is:

1. A vehicular air conditioning apparatus comprising:
    a casing mounted in the vehicle and having a plurality of passages therein through which air flows;
    a cooling heat exchanger for cooling the air comprising first and second cooing sections separated by a first portioning means, and a heating heat exchanger for heating the air comprising first and second heating section separated by a second portioning means;
    a first blower for blowing the air toward a seat or a group of seats on a forward side of the vehicle;
    a first air mixing damper for adjusting a first passage through which air that is blown from the first blower flows and air comes from the first cooling section and enters into the first heating section and for adjusting the temperature of the air;
    a second blower for blowing the air that is blown out toward a seat or group of seats on a mid and/or rearward side of the vehicle;
    a second air mixing damper for adjusting a second passage through which air that is blown from the second blower flows and air comes from the second cooling section and enters into the second heating section and for adjusting the temperature of the air; and
    a pair of communication switching dampers for switching a communication state between the first passage and the second passage and between a downstream side of the cooling heat exchanger and an upstream side of the heating heat exchanger of the first passage and the second passage,
    wherein the pair of communication switching dampers respectively opens and closes a pair of openings disposed between the first passage and the second passage and between the downstream side of the cooling heat exchanger and the upstream side of the heating heat exchanger so that the pair of communication switching dampers establishes and blocks air flow communication between the first passage and the second passage and between the downstream side of the cooling heat exchanger and the upstream side of the heating heat exchanger;
    the first passage comprises a pair of passages made up of a passage through which air flows that is blown to a driver's seat side in a vehicle compartment and a passage through which air flows that is blown toward a passenger seat side in the vehicle compartment, and the pair of communication switching dampers are disposed side-by-side in a widthwise direction of the vehicle in one passage and another passage of the pair of passages respectively;
    one of the communication switching dampers, which is disposed in the one passage through which air flows to the driver's seat side, and another of the communication switching dampers, which is disposed in the other passage through which the air flows to the passenger seat side, are disposed for rotation separately and independently from each other;
    the communication switching dampers are rotated toward a side of the second passage, whereby air that is blown from the second blower is made to flow toward a side of the first passage.

2. The vehicular air conditioning apparatus according to claim 1, wherein the air cooled by the first cooling section and the air cooled by the second cooling section do not mix with each other when the first air mixing damper blocks the first passage through which air comes from the first cooling section and enters into the first heating section and the pair of communication switching dampers block the communication between the first passage and the second passage and between the downstream side of the cooling heat exchanger and the upstream side of the heating heat exchanger of the first passage and the second passage.

3. The vehicular air conditioning apparatus according to claim 1, wherein the casing comprises first and second divided casings and a center plate therebetween and the pair of communication switching dampers are disposed on either side of the center plate.

4. The vehicular air conditioning apparatus according to claim 1, wherein the pair of communication switching dampers are disposed immediately above the cooling heat exchanger, and the heating heat exchanger is disposed immediately above the pair of communication switching dampers.

5. The vehicular air conditioning apparatus according to claim 4, wherein the first air mixing damper is disposed immediately above the cooling heat exchanger such that the air cooled by the first cooling section is supplied straight up to the first heating section through the first air mixing damper.

6. The vehicular air conditioning apparatus according to claim 1, wherein the first and second blowers are driven independently from each other by first and second fan drivers.

7. The vehicular air conditioning apparatus according to claim 4, wherein one end of the cooling heat exchanger in the forward direction of the vehicle is inclined downward and one end of the heating heat exchanger is inclined in the same direction as said one end of the cooling heat exchanger such that the air cooled by the cooling heat exchanger is supplied straight up to the heating heat exchanger.

* * * * *